United States Patent [19]
Szlaga et al.

[11] Patent Number: 4,816,045
[45] Date of Patent: Mar. 28, 1989

[54] VAPOR RECOVERY SYSTEM

[75] Inventors: Emil Szlaga; Robert S. Harris; Robert H. Thompson, all of Connersville, Ind.

[73] Assignee: Stant Inc., Connersville, Ind.

[21] Appl. No.: 106,632

[22] Filed: Oct. 8, 1987

Related U.S. Application Data

[63] Continuation-in-part of Ser. No. 846,081, Mar. 31, 1986, Pat. No. 4,707,164.

[51] Int. Cl.[4] .................. B01D 19/00; B01D 53/04
[52] U.S. Cl. .......................................... 55/168; 55/88; 55/387; 141/286; 220/85 VR; 220/85 VS; 220/86 R
[58] Field of Search ............... 55/88, 165, 168, 182, 55/387; 141/44, 45, 286, 302; 220/85 VR, 85 VS, 86 R

[56] References Cited

U.S. PATENT DOCUMENTS

| | | |
|---|---|---|
| 3,289,711 | 12/1966 | Hall . |
| 3,477,611 | 11/1969 | Niles . |
| 3,543,484 | 12/1970 | Davis . |
| 3,643,690 | 2/1972 | Sarai . |
| 3,752,135 | 8/1973 | Peterson et al. . |
| 3,763,901 | 10/1973 | Viland . |
| 3,854,911 | 12/1974 | Walker . |
| 3,884,204 | 5/1975 | Krautwurst et al. . |
| 3,907,010 | 9/1975 | Burtis et al. ............ 141/45 |
| 3,907,153 | 9/1975 | Mutty . |
| 3,911,977 | 10/1975 | Berger . |
| 3,921,412 | 11/1975 | Heath et al. . |
| 4,034,784 | 7/1977 | Ball et al. . |
| 4,044,913 | 8/1977 | Brunnert . |
| 4,122,968 | 10/1978 | Mermain ............ 220/86 R |
| 4,142,647 | 3/1979 | Walters . |
| 4,312,649 | 1/1982 | Fujii et al. . |
| 4,323,166 | 4/1982 | Maeroff . |
| 4,384,962 | 5/1983 | Harris . |
| 4,420,392 | 12/1983 | Harris . |
| 4,441,533 | 4/1984 | Snyder et al. . |
| 4,497,714 | 2/1985 | Harris . |
| 4,566,504 | 1/1986 | Furrow et al. ............ 141/45 X |
| 4,610,284 | 9/1986 | Bartholomew . |
| 4,630,749 | 12/1986 | Armstrong et al. ............ 220/86 R |
| 4,651,889 | 3/1987 | Uranishi et al. . |
| 4,701,198 | 10/1987 | Uranishi et al. ............ 55/387 |
| 4,714,172 | 12/1987 | Morris . |
| 4,722,454 | 2/1988 | Fischer . |
| 4,747,508 | 5/1988 | Sherwood ............ 220/86 |

OTHER PUBLICATIONS

On–Board Refueling Vapor Recovery System VII (5–9-86/MB/7820).
Pneumatic Running Loss Control Valve (5/27-86/RTC/7820; one figure), (5-2-7-86/RTC/7820; two figures; Sketch 1-RLCV).
Preliminary Performance Requirements PPF–7820-6 (Change Level "A"/5-19-86/D. McGeary/7820).

*Primary Examiner*—Charles Hart
*Attorney, Agent, or Firm*—Barnes & Thornburg

[57] ABSTRACT

A vapor handling system is provided to control fuel vapor in a vehicle fuel system to prevent the fuel vapor from escaping to the atmosphere during filling of the vehicle fuel tank. An on-board vacuum-actuated system is included for preventing overfilling of the tank by automatically triggering shut-off of fuel flow from a fuel-dispensing nozzle when the fuel tank is full. A control valve system is also included for protecting the canister from exposure to liquid fuel during an overfill condition which may be caused by a malfunction of a fuel-dispensing nozzle.

42 Claims, 7 Drawing Sheets

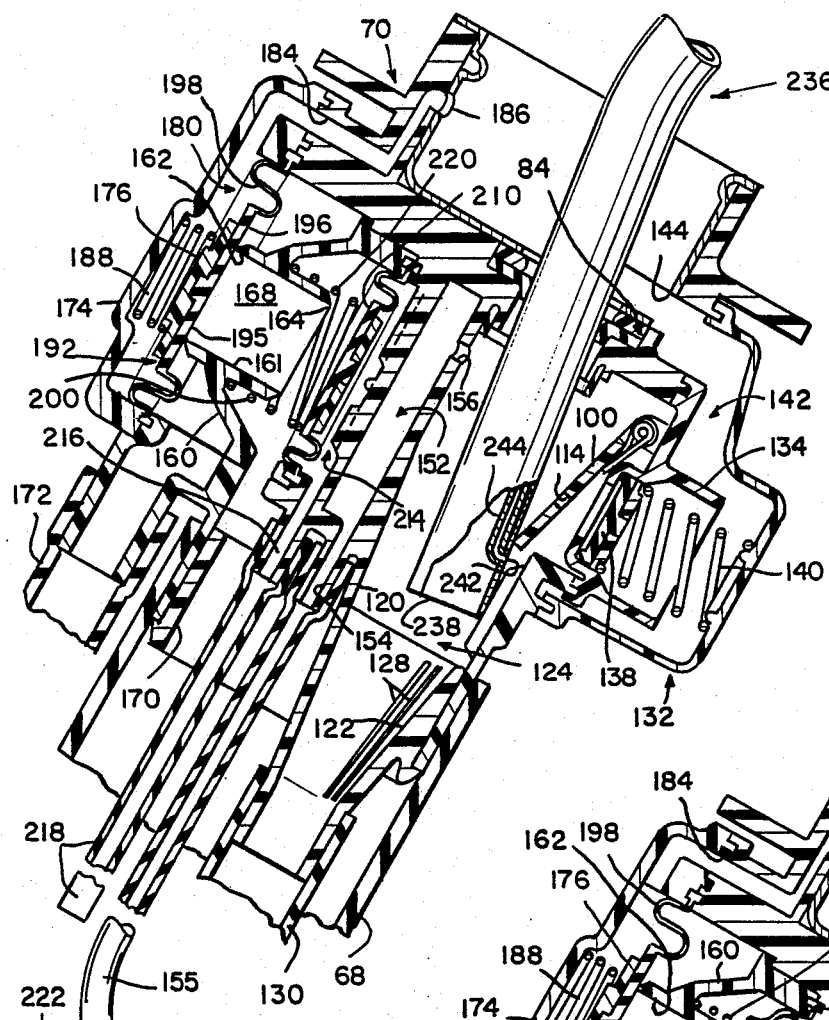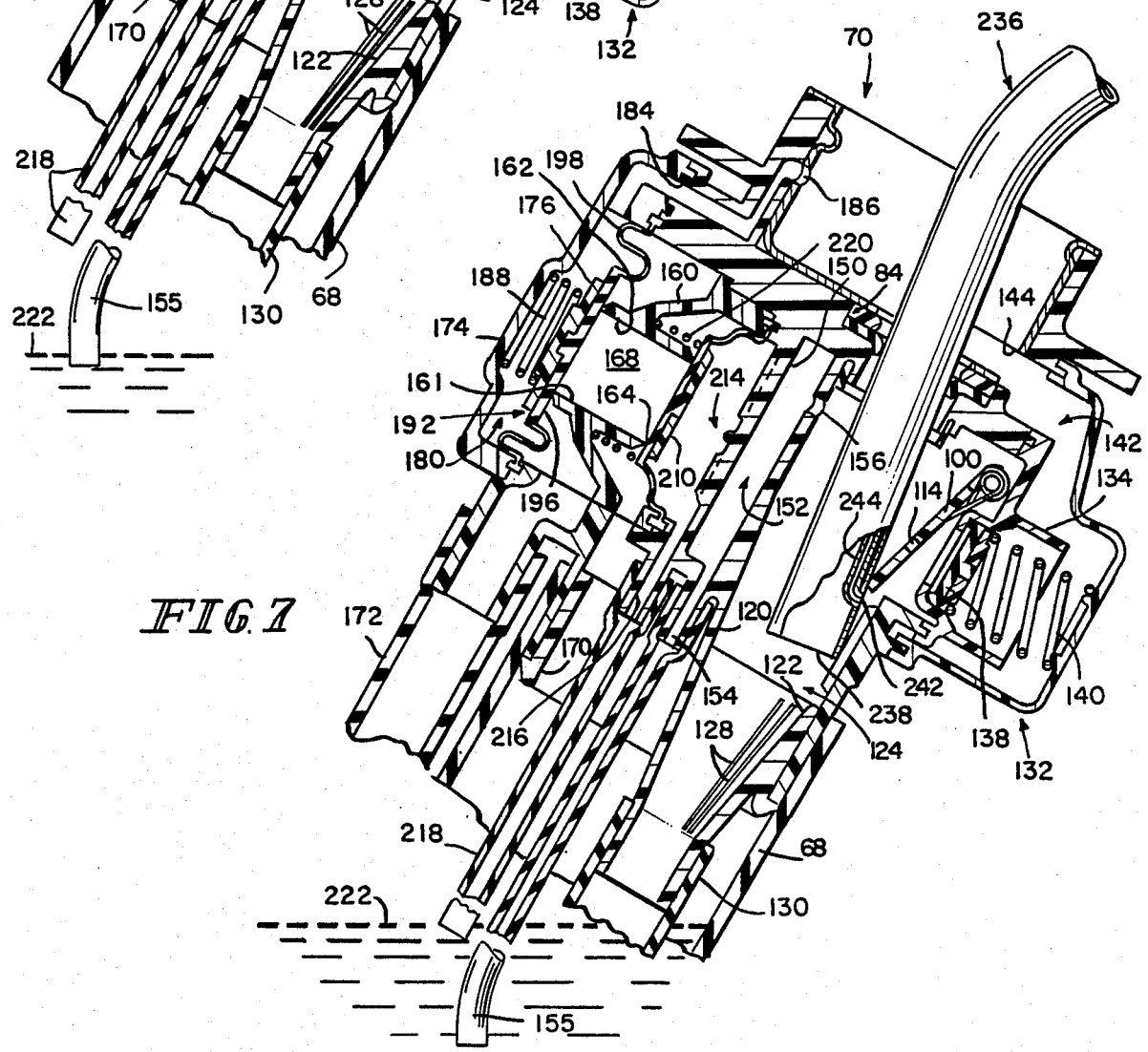

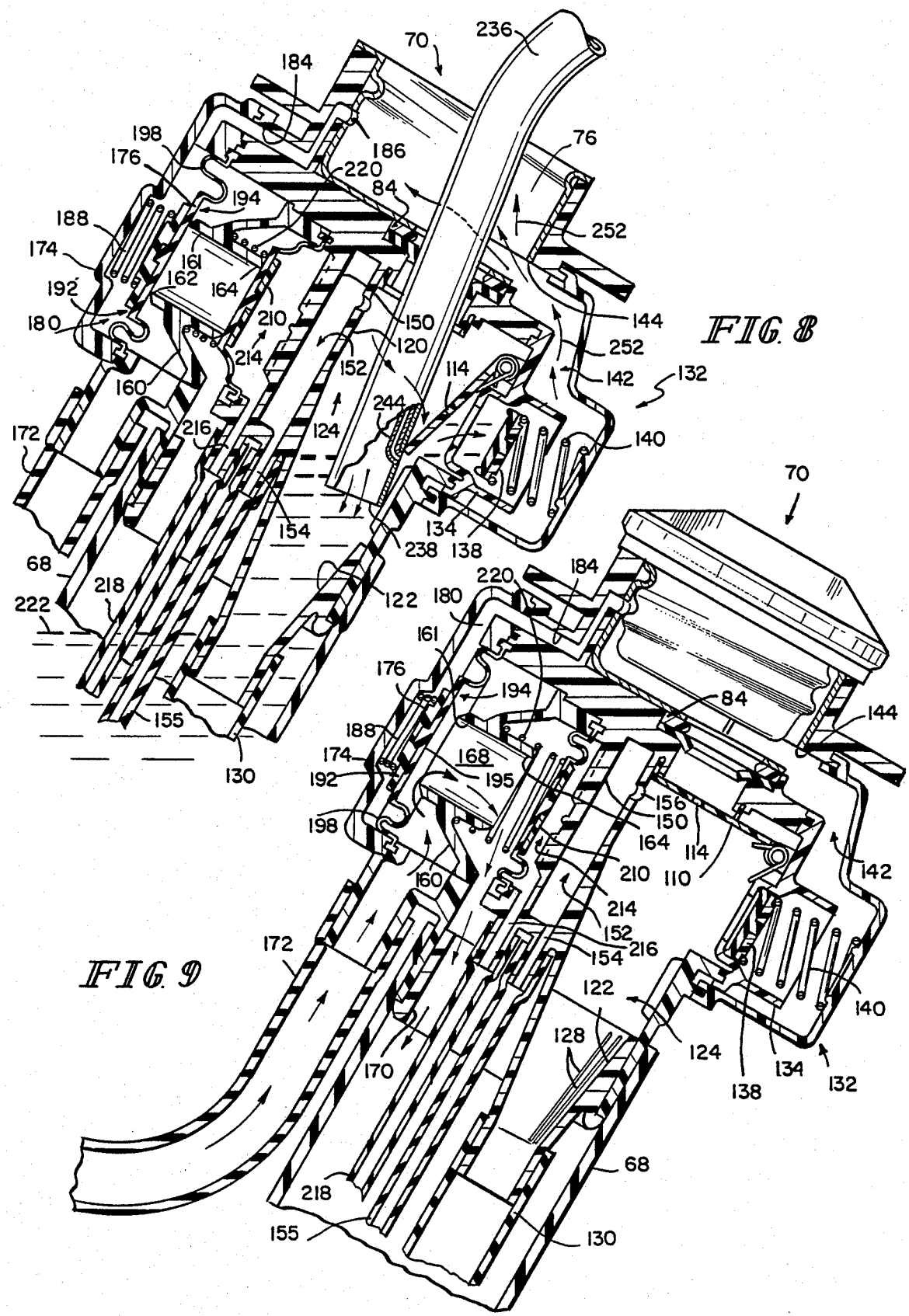

VAPOR RECOVERY SYSTEM

BACKGROUND AND SUMMARY OF THE INVENTION

This application is a continuation-in-part of co-pending application Ser. No. 06/846,081, filed Mar. 31, 1986 U.S. Pat. No. 4,707,164.

The present invention relates to a vapor control system for controlling vapor in a vehicle fuel system. More particularly, the present invention relates to a vapor handling system which controls vapor in the fuel system and/or vapor created during filling of the fuel tank to prevent the vapor from escaping to the atmosphere during the filling process and for controlling the filling operation of the tank to aid in preventing overfilling of the tank.

It is now understood that a significant quantity of fuel vapor is permitted to escape to the atmosphere during the refueling of motor vehicles. Conventional filler necks and fuel tank assemblies on vehicles are not configured to control this escape of fuel vapor during the refilling process. Generally, the filler neck of a vehicle has a diameter substantially greater than the diameter of the fuel dispensing nozzle. Because of the relatively large diameter of the filler neck with respect to the fuel dispensing nozzle, the fuel vapor created by fuel dispensed into the fuel tank through the filler neck escapes out through the filler neck and to the atmosphere substantially continuously during the filling operation. This creation of fuel vapor during the refueling process has recently been recognized as a major contributor to pollution of the atmosphere, especially with newer, more volatile blends of vehicle fuel.

Attempts have been made to control this escape of fuel vapor during the filling process by adapting the service station fuel dispensing nozzle to include a vapor recovery portion which captures the escaping fuel vapor and prevents the fuel vapor from escaping into the atmosphere. Such conventional methods of capturing the escaping fuel vapor have generally proved unsatisfactory because of the complexity of the system and because of relatively poor vapor capturing characteristics of the system. It is generally recognized that for satisfactory fuel vapor control during refilling, a system must be provided which is on-board the vehicle for capturing and controlling such fuel vapor generated during refilling. Ideally, such a system would work automatically without any operator supervision.

Another problem with conventional filler neck and fuel tank assemblies is that it is sometimes extremely difficult to achieve accurate filling levels because of the configuration of the filler neck, and further because all conventional filler neck and fuel tank assemblies rely upon fuel splashed back upon the fuel dispensing nozzle to shut off the fuel nozzle. Relying upon fuel splash back provides generally unsatisfactory fill level consistency because such fuel splash back is dependent upon a number of factors. Such factors include the flow rate of the nozzle, the configuration and routing of the filler neck, and the general orientation of the filler neck with the fuel tank, as well as fuel dispensing nozzle sensitivity. Because of such inconsistency in achieving accurate fill levels, it would be advantageous to provide a more accurate nozzle shutoff control which would ideally permit the fuel tank to be filled to accurate, consistent fill levels during each refueling operation.

One object of the present invention is to provide a fuel vapor handling system which controls the escape of fuel vapor created during the fuel refilling process, with the system mounted on-board the vehicle.

Another object of the present invention is to provide a vapor handling system which is automatically activated during refueling, and which is automatically disabled whenever refueling ceases.

Yet another object of the present invention is to provide a vapor handling system which includes protection for the canister from exposure to liquid fuel during an overfill condition which may be caused by a malfunction of a refueling nozzle.

Yet another object of the present invention is to provide a vapor handling system which provides a safety bypass valve which will prevent overpressurization of the fuel tank during an overfill condition which may be created by the malfunction of the refueling nozzle.

Yet another object of the present invention is to provide a vapor handling system which will enable the fuel tank to communicate to the atmosphere whenever a lower than atmospheric pressure exists within the fuel tank.

According to the present invention, a system for handling fuel vapor from a vehicle fuel system which includes a fuel tank and a canister for processing fuel vapor is provided. The system includes delivery means for conducting fuel vapor between the fuel tank and the canister means. Valve means is provided for selectively blocking flow of fuel vapor through the delivery means under certain conditions. The valve means is movable between a flow-blocking position and flow-delivery positions. Passageway means is provided for communicating a closing pressure from the fuel tank to the valve means to move the valve means to its flow-blocking position. Actuation means is provided for selectively venting the passageway means to the atmosphere to dissipate any closing pressure existing therein to permit pressure generated by fuel vapor in the fuel tank having a magnitude in excess of a predetermined threshold level and communicated to the valve means via delivery means to apply a load to the valve means sufficient to move the valve means from its flow-blocking position to a flow-delivery position. This advantageously permits pressurized fuel vapor to flow from the fuel tank to the canister through the delivery means.

In preferred embodiments of the present invention, a delivery means includes an inner surface defining a venting aperture and providing a valve seat surrounding the venting aperture. In addition, the valve means includes a venting valve position at a junction of a delivery means and the passageway means to provide a common boundary between the delivery means and the passageway means. This enables the venting valve to receive pressure communicated via the passageway means and pressure communicated via delivery means without interconnecting the delivery means and the passageway means in fluid communication. In addition, spring means for yieldably biasing the venting valve against the valve seat to close the venting aperuture is provided.

Also in accordance with the present invention, a system is provided for automatically blocking flow of fuel from a fuel-dispensing nozzle into a fuel tank. The nozzle has a dispensing end and means in the dispensing end for triggering shut-off of fuel flow from the dispensing end upon exposure to a predetermined negative pressure.

The system includes a filler neck which is coupled to the fuel tank and includes chamber means for receiving the nozzle during refueling. The chamber means is formed to include first inlet means for sealingly receiving the dispensing end of the nozzle, second inlet means for receiving a supply of make-up vapor, and outlet means for communicating liquid fuel to the fuel tank. The outlet means has an internal diameter selected to fill the outlet means substantially with fuel during introduction of fuel from the nozzle into the filler neck to establish means for blocking the flow of fuel vapor from the fuel tank to the chamber means through the outlet means during refueling. The system further includes means communicating with the second inlet means for selectively supplying make-up vapor from the fuel tank to the chamber means during refueling so that the magnitude of pressure in the chamber means exceeds the magnitude of the predetermined negative pressure only until the volume of liquid fuel in the fuel tank exceeds a predetermined volume.

In preferred embodiments, the chamber means includes an interior wall formed to define the outlet means. Spacer means is provided for separating the dispensing end of the nozzle from the interior wall to prevent movement of liquid fuel between the dispensing end and the interior wall due to capillary action. The spacer means desirably includes a plurality of upstanding ribs circumferentially spaced about the interior wall.

The supplying means desirably includes a fuel-conducting tube having one end positioned at a predetermined location within the fuel tank and the other end coupled to the second inlet means so that introduction of liquid fuel into the one end effectively shuts off the supply of make-up vapor from the fuel tank to the chamber means, thereby increasing the negative pressure within the inner chamber during continued refueling.

Additional objects, features, and advantages of the invention will become apparent to those skilled in the art upon consideration of the following detailed description of the preferred embodiments exemplifying the best mode of carrying out the invention as presently perceived.

BRIEF DESCRIPTION OF THE DRAWINGS

FIG. 6 is a view similar to FIG. 5 showing operation of the assembly to control the automatic shutoff of the fuel nozzle;

FIG. 7 is a view similar to FIG. 6 showing operation of the assembly during a partial overfill condition;

FIG. 8 is a view similar to FIG. 7 showing operation of the assembly during a continued overfill condition;

FIG. 9 is a view similar to FIG. 8 showing operation of the assembly during a lower than normal pressure condition within the fuel tank;

DETAILED DESCRIPTION OF THE DRAWINGS

Figure 1:
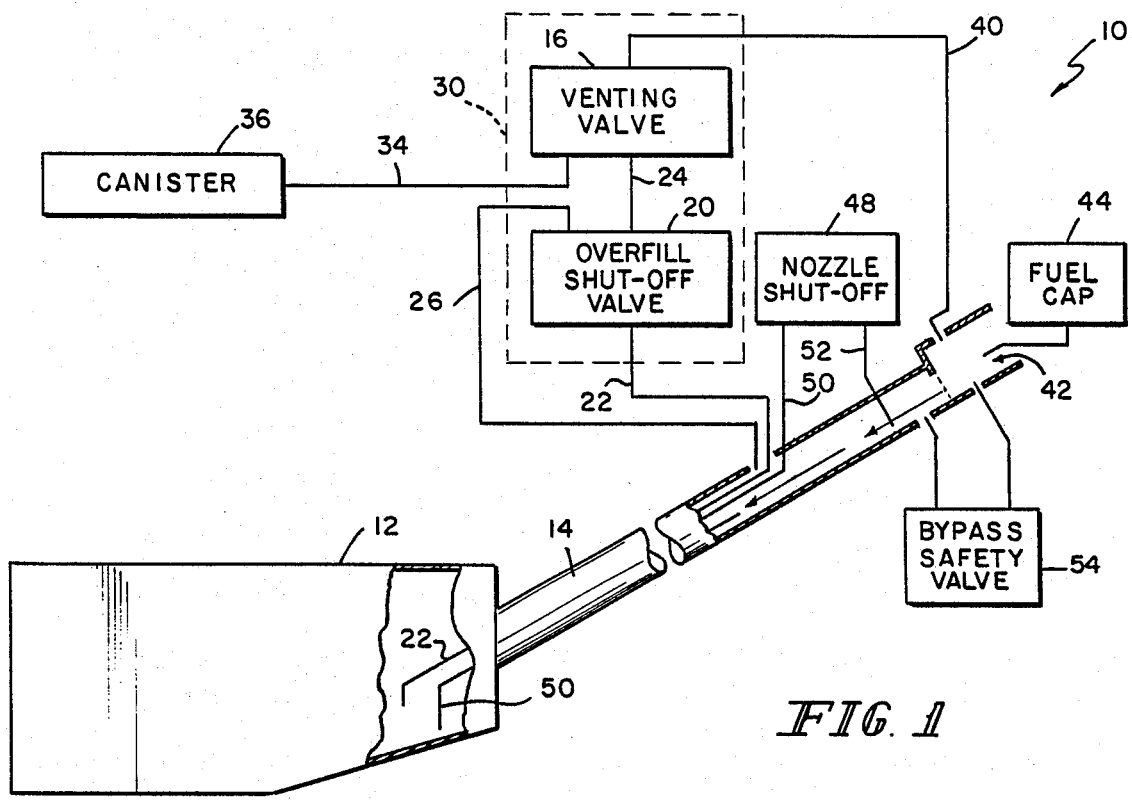
FIG. 1 is a partial block diagram schematically illustrating the tank conduit and vapor control arrangement according to one embodiment of the present invention.

Referring now to the drawings, and specifically to FIG. 1, one preferred embodiment of a fuel vapor recovery system 10 is illustrated in block diagram. The fuel vapor recovery system 10 includes a fuel tank 12 having a conduit 14. The system 10 also includes a venting valve 16, and an overfill shutoff valve 20. One input to the overfill shutoff valve 20 is provided by an overfill valve hose 22 which extends into the fuel tank 12. The venting valve 16 and overfill shutoff valve 20 are placed in fluid communication by a vapor flow passage 24. Fuel vapor (not shown) is permitted to flow from the conduit 14 through a fuel vapor escape hose 26, past the overfill shutoff valve 20, to the venting valve 16. The venting valve 16 and overfill shutoff valve 20, as well as the vapor flow passage 24, cooperate to form a refueling vent control valve assembly 30.

The refueling vent control valve assembly 30 acts to control the flow of fuel vapor from the fuel tank 12 and conduit 14 through a fuel vapor discharge hose 34 to a conventional canister 36. It will be understood that the canister 36 acts as a fuel vapor treatment site for treating and controlling fuel vapor routed thereto. Preferably, the canister 36 is a conventional charcoal canister or other vapor condenser which adsorbs liquid fuel entrained in the recovered fuel vapor onto a substrate to permit recombustion within the vehicle engine (not shown).

The venting valve 16 is at least partially controlled by an actuation conduit 40 which is coupled to a cap receiving cavity 42 which is normally sealed by a conventional fuel cap 44. It will be understood that the fuel cap 44 may be removed from the cap receiving cavity 42 to initiate the filling operation. The actuation conduit 40 acts to communicate various pressure levels to the venting valve 16 depending upon various operating conditions of the system 10, and acts as one input into the control of the position of the venting valve 16. The conduit 14, the cavity 42, and the actuation conduit 40 cooperate to form passageway means for communicating pressure to the venting valve 16 under certain conditions.

The system 10 also includes a nozzle shutoff means 48 which is configured to control the shut off of a fuel dispensing nozzle (not shown) during the filling operation. The nozzle shutoff means 48 receives an input from a nozzle shutoff hose 50 which extends into the fuel tank 12. The nozzle shutoff means 48 has an output which communicates to the upper portion of the conduit 14 to control the shutoff operation of the fuel dispensing nozzle. In addition, system 10 includes a bypass safety valve means 54 which provides selective venting communication between the conduit 14 and the cap receiving cavity 42 under certain operating conditions.

It will be understood that the vapor recovery system 10 illustrated in FIG. 1 is included in the vehicle, and specifically, except for the canister 36, may be mounted on the conduit 14 leading to the fuel tank 12.

Figure 2:
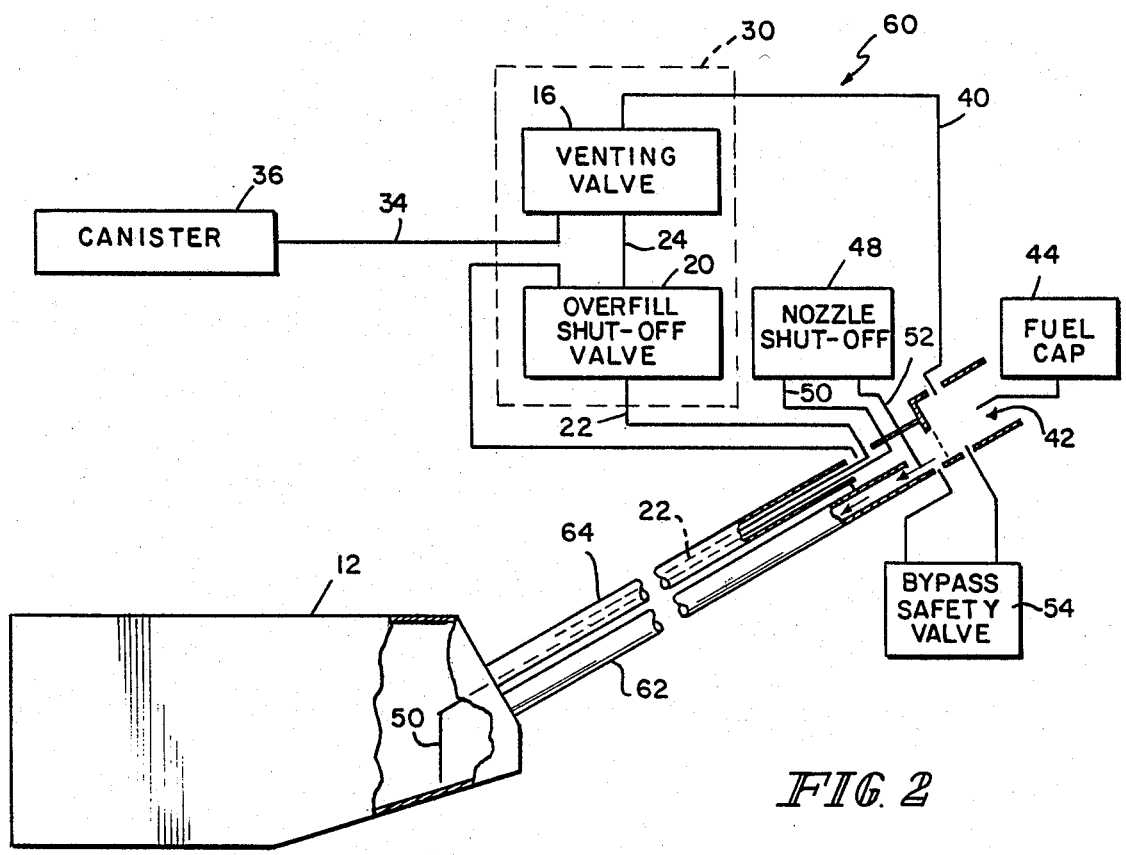
FIG. 2 is a partial block diagram schematically illustrating the tank conduit and vapor control arrangement according to another embodiment of the present invention.

FIG. 2 shows another embodiment of a vapor recovery system 60 in block diagram which operates substantially like the system 10 illustrated in FIG. 1. In the vapor recovery system 60, the conduit illustrated in FIG. 1 is divided into two separate tubes. Specifically, the system 60 includes a fuel fill tube 62 for routing fuel to the fuel tank 12, and a separate control tube 64 for providing the vapor flow path to the venting valve 16 and for providing the necessary inputs to the overfill shutoff valve 20 and the nozzle shutoff 48. A system 60 as illustrated in FIG. 2 may be preferable to the system 10 illustrated in FIG. 1 depending upon the mounting requirements within different vehicles. However, the function of the systems 10 and 60 is substantially the same.

Figure 3:
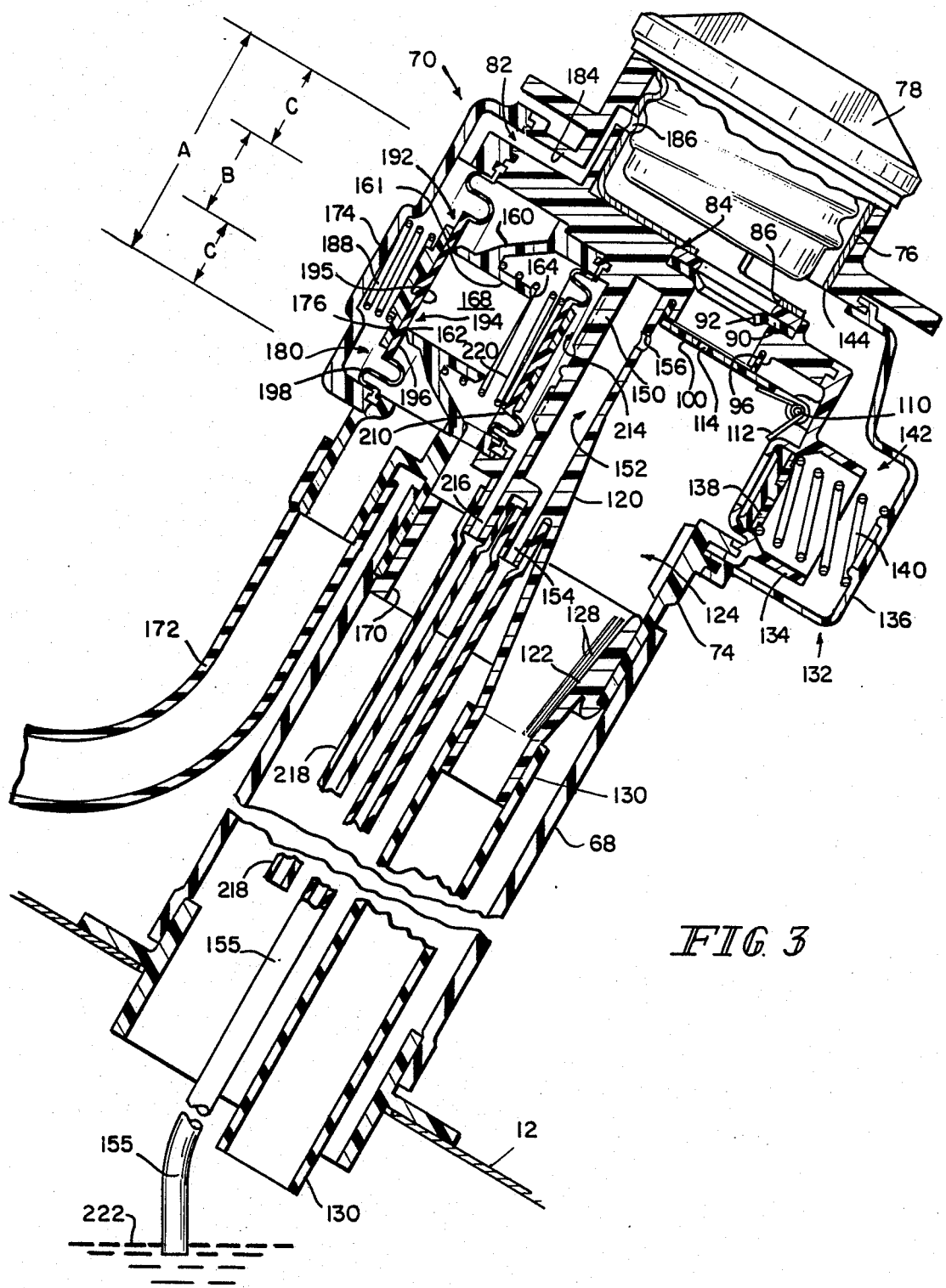
FIG. 3 is a transverse sectional view of the vapor recovery assembly illustrated in FIG. 1 in combination with a fuel tank.

FIG. 3 illustrates the preferred embodiment of the system 10 shown in block diagram in FIG. 1. Specifically, FIG. 3 illustrates a vapor recovery assembly 70 which includes all of the functions of the system 10 illustrated in FIG. 1. The assembly 70 is a generally concentric elongated structure which includes a housing assembly 74 which is mated with a generally cylindrical outside hose member 68 to form the generally cylindrical, elongated assembly 70. As can be seen, the outside hose member 68 is mounted on and extends through a wall of the fuel tank 12.

A cap receiving cup 76 is included in the axially upper portion of the housing assembly 74. The cap receiving cup 76 includes formed threads which are configured to receive the threads on a conventional fuel cap 78. Illustratively, the cap 78 is of the type which enables pressure within the fuel system to vent before the seal between the fuel cap 78 and a seal (not shown) around the cap receiving cup 76 is broken. Such a fuel cap is illustrated in U.S. Pat. No. 4,676,390 to Harris which is assigned to the assignee of the present invention.

A housing insert 82 is disposed within the housing assembly 74 to define various internal structure within the vapor recovery assembly 70. The housing insert 82 is formed to include an axially upper orifice 84 which is in fluid communication with an opening 86 in the cap receiving cup 76. A nozzle seal assembly 90 is disposed around the axially upper portion of the orifice 84. The nozzle seal assembly 90 includes an annular seal 92 which is sized and configured to receive and seal around a conventional fuel dispensing nozzle (not shown in FIG. 3) when such a nozzle is inserted through the nozzle seal assembly 90 and seal 92. An axially downwardly facing ledge 96 is formed on the axially lower portion of the orifice 84 such that the ledge 96 forms a generally circular seat.

Figure 5:
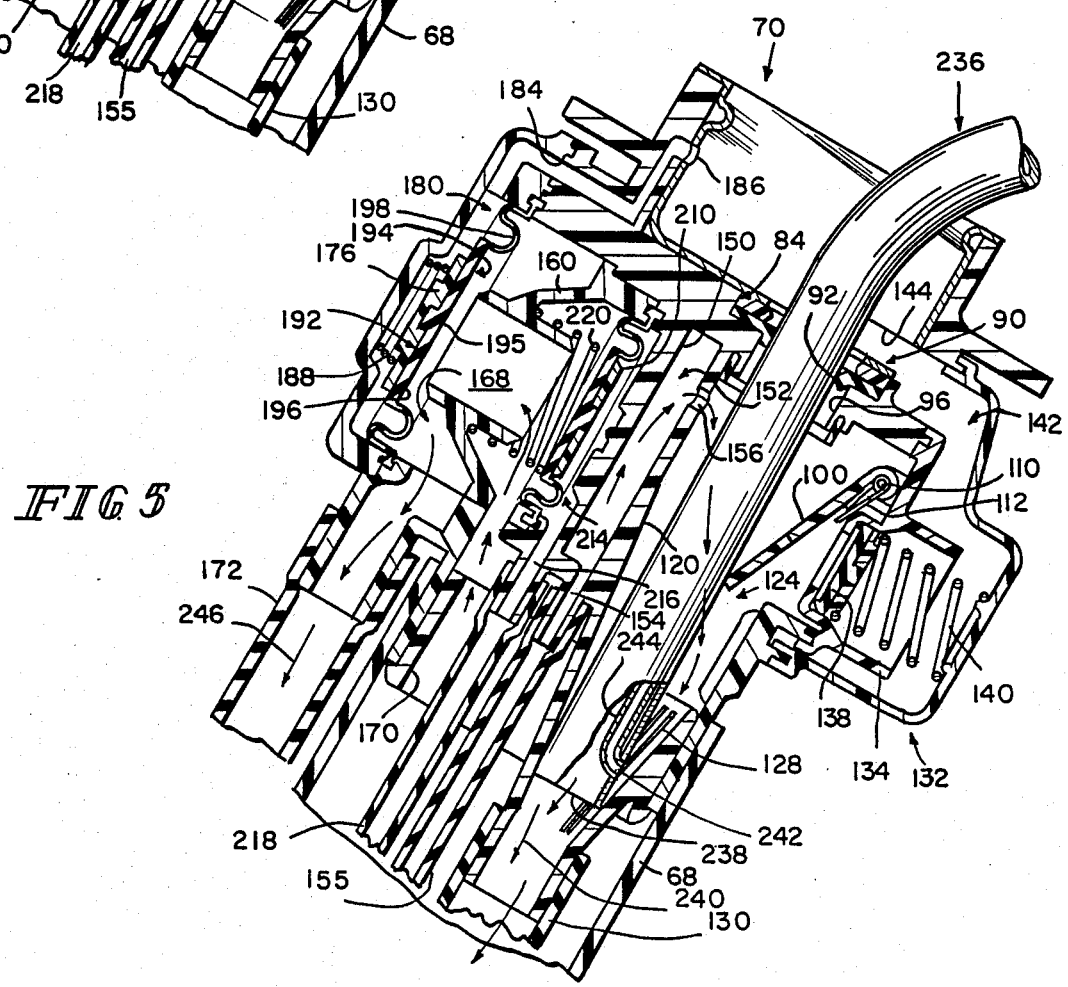
FIG. 5 is a view similar to FIG. 4 showing the operation of the assembly during refueling.

A trap door assembly 100 is provided and is biased to contact the seat formed by the ledge 96 under normal operating conditions. The trap door assembly 100 is mounted on a pivot 110 which permits the trap door assembly 100 to move between a closing position as shown in FIG. 3 and an open position as shown in FIG. 5. A spring 112 is provided to normally bias the trap door assembly 100 to the closed position where it contacts the ledge 96 to form a substantially fluid tight seal. An orifice 114 is provided in the trap door assembly 100 to permit a limited degree of venting communication through the trap door assembly 100. The necessity of this limited venting communication will be discussed later. Illustratively, the orifice 114 is a circular orifice having a diameter of approximately 0.030 inches (0.076 cm.).

The housing insert 82 includes a generally longitudinally extending inner wall 120 and a shorter, generally longitudinally extending outer wall 122. The inner wall 120 and the outer wall 122 converge somewhat in the direction away from the orifice 84, and cooperate to form a somewhat tapered conical fuel nozzle chamber 124. The fuel nozzle chamber 124 is thus bounded at its axially upper end by the normally closed trap door assembly 100 and at the sides by the inner wall 120 and the outer wall 122. The axially lower portion of the fuel nozzle chamber 124 is open and is coupled to a fuel hose 130 which extends axially downwardly into the fuel tank 12. Ribs 128 are formed on a portion of the interior surface of the fuel nozzle chamber 124, with the ribs extending generally longitudinally and circumferentially spaced apart from each other. The use of the ribs 128 will be discussed later.

A bypass safety valve assembly 132 is included in the housing insert 82 near the axially upper portion of the fuel nozzle chamber 124. The bypass safety valve assembly 132 includes a bypass insert member 134 which is inserted into the housing insert 82. A bypass cover 136 is disposed on the housing insert 82 and located radially outwardly from the bypass insert member 134. A bypass valve member 138 is disposed for radial movement within the bypass insert member 134 and is configured to move between a valve closed position and a valve open position. A bypass valve spring 140 is provided which acts against the bypass cover 136 to normally urge the bypass valve member 138 to the valve closed position. A bypass channel 142 is provided by the bypass cover 136 and which is configured to permit selective venting communication between the fuel nozzle chamber 124 and a bypass opening 144 formed in the cap receiving cup 76 when the bypass valve member 138 is in the valve open position. The use of the bypass channel 142 to provide selective venting communication between the fuel nozzle chamber 124 and the cap receiving cup 76 will be discussed later.

A chamber defining wall 150 is included in the housing insert 82 in a substantially parallel, spaced apart relation to the inner wall 120. The chamber defining wall 150 cooperates with the inner wall 120 and a portion of the housing insert 82 to form a nozzle shutoff control chamber 152. The nozzle shutoff control chamber 152 includes an inlet 154 which is connected to a nozzle Shutoff hose 155 that extends into the fuel tank 12. An orifice 156 is formed in the inner wall 120 to permit controlled venting communication between the control chamber 152 and the fuel nozzle chamber 124.

A venting insert 160 is attached to a portion of the housing assembly 74 and a portion of the housing insert 82. The venting insert 160 includes a generally cylindrical shaped channel portion 161 which has an axially outer end 162 and an axially inner end 164. The channel portion 161 forms a vapor flow passage 168 for conducting fuel vapor (not shown) away from the fuel tank 12. Fuel vapor from the fuel tank 12 is directed toward the vapor flow passage 168 through a vapor conduit 170 and the outside hose member 68. A vapor discharge hose 172 is provided to guide the fuel vapor from the outer end 162 of the vapor flow passage 168 toward the canister (not shown in FIG. 3).

A venting cover 174 is attached to the housing assembly 74 radially outwardly from the venting insert 160. A venting valve 176 is provided between the outer end 162 of the venting insert 160 and the venting cover 174. The venting valve 176 is configured to selectively seal the outer end 162 of the venting insert 160 under selected operating conditions. The venting valve 176 is configured to move between a valve closed position as shown in FIG. 3 and a valve open position (not shown in FIG. 3) to selectively control the flow of fuel vapor through the vapor flow passage 168.

The venting cover 174 and venting valve 176 are configured to cooperate to form a venting control chamber 180 between the venting cover 174 and the venting valve 176. The venting control chamber 180 is coupled for fluid communication to the cap receiving cup 76 through an actuation conduit 184. The actuation conduit 184 terminates in an actuation conduit opening 186 in the cap receiving cup 76. Except for the actuation conduit 184, the venting control chamber 180 is a sealed chamber, the use of which will be discussed later. A venting valve spring 188 is disposed between the venting cover 174 and the venting valve 176 to provide a biasing force to bias the venting valve 176 to the valve closed position in the absence of any other forces acting on the venting valve 176.

The venting valve 176 is a generally circular valve having an axially outer or first side 192 and an axially inner or second side 194. The second side 194 is effectively divided into two portions, an inner portion 195 and an outer or peripheral portion 196. The demarcation between the inner portion 195 and the outer portion 196 is defined by the venting insert 160, and specifically the outer end 162 of the venting insert 160. Specifically, the portion of the second side 194 of the venting valve 176 bounded by the generally circular outer end 162 of the venting insert 160 defines the inner portion 195. The portion outside of the outer end 162 of the venting insert 160 defines the peripheral portion 196. The first side 192 of the venting valve 176 has a diameter indicated by the dimension A. The inner portion 195 of the second side 194 of the venting valve 176 has a diameter indicated by the dimension B. The peripheral portion 196 has a width indicated by the dimensions C. It will be understood that the dimension B plus two times the dimension C equals the dimension A.

A flexible diaphragm 198 is provided to flexibly attach the venting valve 176 to the housing assembly 74 and housing insert 82. The flexible diaphragm 198 is configured to permit axial movement of the venting valve 176 without imposing any force on the venting valve 176 in either the valve closing direction or the valve opening direction.

It will be understood by referring to FIG. 3 that the two portions 195, 196 of the second side 194 of the venting valve 176 may be exposed to differing pressures under certain circumstances. In addition, the first side 192 of the venting valve 176 may be exposed to a pressure from the venting control chamber 180 which may differ from one or both of the pressures exerted on the second side 194 of the venting valve 176. Because of the relative dimensions of the first side 192 and the two portions 195, 196 of a second side 194, the pressures exposed to the first side 192 and the separate portions 195, 196 may create differing forces acting on the venting valve 176 which can cause the valve 176 to move either to the valve closed position or the valve open position depending upon the conditions at that time.

Specifically, the pressure within the venting control chamber 180 acts over the area of the first side 192 of the venting valve 176 illustrated by the dimension A to create a force which acts on the first side 192 of the valve 176. The pressure within the vapor discharge hose 172 acts on the portions 196 of the second side 194 of the valve 176 illustrated by the dimensions C to create a force on the portion 196. Additionally, pressure within the vapor flow passage 168 acts on the inner portion 195 of the second side 194 of the valve 176 illustrated by dimension B to create a force on the portion 195. Depending upon the conditions, these forces acting on the venting valve 176 created by the pressures acting over the respective areas may cause the venting valve 176 to move to the valve open position or the valve closed position. Thus, at certain times in the operation of the assembly 70, differing forces may be acting on both sides of the venting valve 176, dictated by differing pressures and pressure exerting areas of different sizes on both sides of the valve 176. These differing forces, combined with the biasing force of the spring 188 act to control the movement of the venting valve 176 to control the flow of vapor through the vapor flow passage 168.

An overfill shutoff valve 210 is mounted within the housing insert 82 to selectively seal the inner end 164 of the venting insert 160 under certain circumstances. Specifically, the overfill shutoff valve 210 is configured to move between a valve open position as shown in FIG. 3 and a valve closed position (shown in FIG. 7) which will close the vapor flow passage 168. The valve 210 cooperates with the chamber defining wall 150 to define an overfill control chamber 214 therebetween. The control chamber 214 includes an opening 216 which communicates through an overfill tube 218 to the interior of the outside hose 68. A spring 220 is provided which acts between the venting insert 160 and the shutoff valve 210 to normally bias the valve 210 to its valve open position. The overfill control chamber 214 is configured such that when fuel enters the overfill tube 218, an increased pressure is created within the control chamber 214 which overcomes the biasing force of the spring 220 and forces the shutoff valve 210 to the valve closed position. This operation of the valve 210 to close the vapor flow passage 168 will be discussed later.

In operation, and continuing to refer to FIG. 3, under normal vehicle operation with the cap 78 installed in the assembly 70, the fuel system, and specifically the fuel tank 12 will be slightly pressurized because of vaporization of fuel 222 within the fuel tank 12. This pressure created within the fuel tank 12 will be present within the assembly 70, and specifically will be present within the vapor conduit 170, the fuel nozzle chamber 124, and the cap receiving cup 76. This pressure within the fuel tank 12 and other portions of the assembly 70 will be referred to as "system pressure". This "system pressure" is communicated to the cap receiving cup 76 from the fuel nozzle chamber 124 through the orifice 114. In addition, this "system pressure" will be communicated from the cap receiving cup 76 to the venting control chamber 180 through the actuation conduit opening 186 and actuation conduit 184.

Thus, under normal operating conditions, the venting valve 176 will have an axially inwardly directed force exerted upon its first side 192 which is created by the "system pressure" within the venting control chamber 180 acting over the area defined by the dimension A. In addition, an axially outwardly directed force will be exerted upon the second side 194 of the venting valve 176 due to the "system pressure" acting on the area defined by the dimension B. Additionally, an axially outwardly directed force will be exerted upon the venting valve 176 due to the pressure within the vapor discharge hose 172 acting upon the area of the peripheral portion 196 indicated by the dimensions C. In the configuration illustrated in FIG. 3, this pressure within the vapor discharge hose 172 will be substantially atmospheric pressure which will be somewhat lower than the "system pressure".

Thus, the axially inwardly directed force, or valve closing force, exerted upon the venting valve 176 will be greater than the axially outwardly directed, or valve opening force, exerted on the venting valve 176. Thus, during normal operation with the cap 78 in place and "system pressure" prevailing within the assembly 70, the venting valve 176 will be held in the valve closed position as illustrated in FIG. 3. In addition to these differing forces created by the differing pressures acting upon differing areas, the biasing force of the spring 188 aids in urging the venting valve 176 to the valve closed position.

With the venting valve 176 in the valve closed position as illustrated in FIG. 3, the vapor flow passage 168 is sealed and no fuel vapor can be vented to the canister (not shown). Should the "system pressure" rise above a predetermined, normal level, such "excessive system pressure" may cause the bypass safety valve assembly 132 to open to vent this excessive pressure to the cap receiving cup 76. This excessive pressure, if it reaches a high enough level, will then be vented through the normal pressure valve (not shown) contained within the fuel cap 78.

Figure 4:
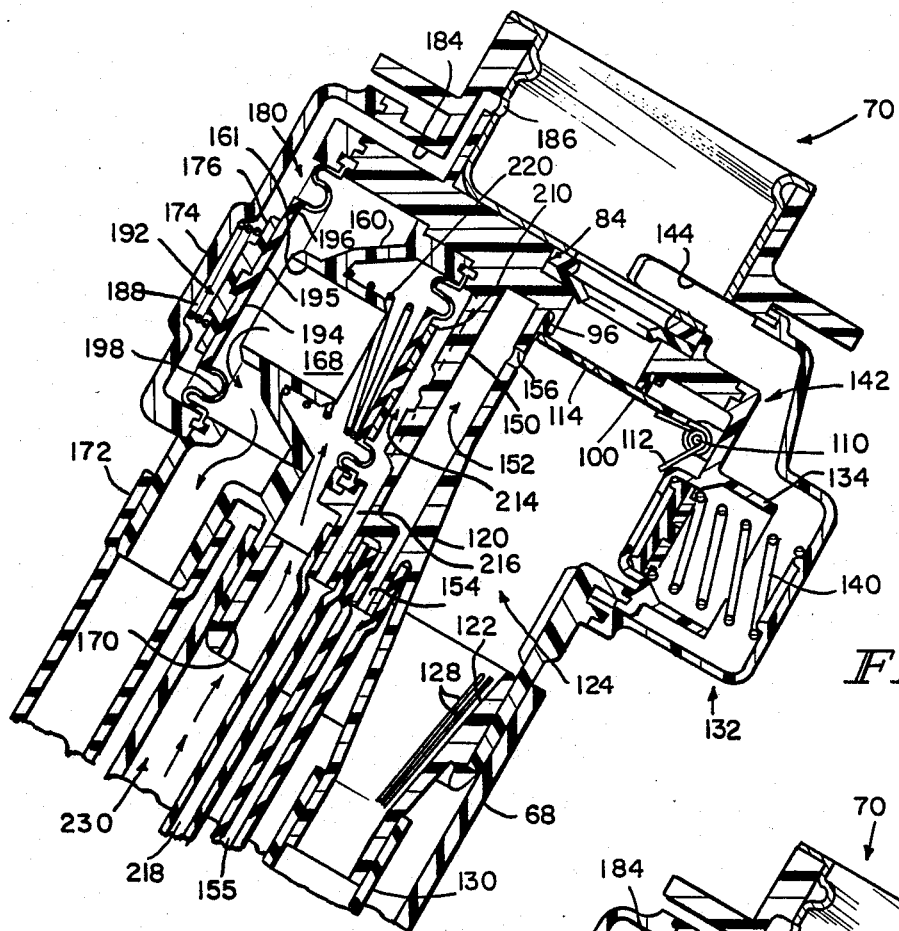
FIG. 4 is a view similar to FIG. 3 with portions broken away showing the operation of the assembly after cap removal.

FIG. 4 illustrates the operation of the vapor recovery assembly 70 during a preliminary step to refueling of the fuel tank 12. Specifically, FIG. 4 illustrates the assembly 70 after the fuel cap 78 has been removed. As discussed previously, during normal vehicle operation a "system pressure" is created within the assembly 70 and fuel tank 12. After fuel cap removal, because the trap door assembly 100 is substantially sealed against the ledge 96, this "system pressure" is not permitted to vent to the atmosphere. The only opening to the atmosphere from the fuel nozzle chamber 124 is through the small orifice 114. The size of this orifice 114 is insufficient to permit rapid venting of the "system pressure" to the atmosphere immediately following cap removal. However, in this configuration, the assembly 70 is configured to vent this "system pressure" through the canister (not shown). Venting through the canister is accomplished by moving the venting valve 176 to the valve open position to open the vapor flow passage 168. The venting valve 176 is moved to the valve open position as follows.

Immediately upon cap removal, the actuation conduit 184 is exposed to atmospheric pressure through the actuation opening 186. This permits the "system pressure" contained within the venting control chamber 180 to dissipate and to lower to atmospheric pressure. After the pressure within the venting control chamber 180 has reduced to atmospheric pressure, the valve closing force exerted upon the first side 192 of the venting valve 176 is reduced because the pressure has been reduced. However, the inner portion 195 of the second side 194 of the venting valve 176 is still exposed to "system pressure" through the vapor flow passage 168. This "system pressure" acting upon the portion 195 creates a force which is greater than the valve closing force exerted on the first side 192 of the venting valve 176. This difference in forces causes the venting valve 176 to move to the valve open position.

With the venting valve 176 open, the "system pressure" is directed through the vapor conduit 170 and vapor flow passage 168 and outwardly to the canister through the vapor discharge hose 172. Thus, before the operator begins the filling operation, the pressure within the fuel tank 12 and assembly 70 will be substantially dissipated to atmospheric pressure.

FIG. 5 illustrates the normal filling operation of the fuel tank 12 by a refuel nozzle 236. The normal refuel nozzle utilized at service stations includes an automatic shutoff feature which normally acts to shutoff the flow of fuel from the nozzle. This automatic shutoff feature is controlled by a vacuum created within the nozzle, such as nozzle 236. As the nozzle 236 pumps fuel, a vacuum or lower than atmospheric pressure is created within the nozzle 236 which overcomes a spring biased valve (not shown) to permit the flow of fuel. However, should the vacuum rise above a certain preset level within the nozzle 236, a diaphragm (not shown) within the nozzle 236 pulls down and overcomes the spring and closes the valve within the nozzle 236 to shut off the flow of fuel. Thus, it is a high vacuum internal to the nozzle 236 that causes the nozzle 236 to shut off.

To eliminate premature vacuum build up within the nozzle 236 during normal pumping of fuel, a relief port 242 is provided substantially near a discharge end 238 of the nozzle 236. This relief port 242 is connected to a relief tube 244 which extends upwardly into the nozzle 236 to prevent the vacuum within the nozzle 236 from building above the preset vacuum level. As long as air or vapor is available to flow through the relief tube 244, the vacuum within the nozzle 236 will not increase to the shutoff level.

Conventionally, normal automatic shut off of the nozzle 236 is accomplished when the fuel tank is substantially filled by permitting fuel to splash back to cover the relief port 242. With the relief port 242 covered, relief air or "make-up" air is eliminated from the relief tube 244, and the vacuum created by pumping fuel within the nozzle 236 increases above the pre-set level to shut the nozzle 236 off. However, because fuel splashback can be highly inconsistent and inaccurate, the vapor recovery assembly 70 relies upon extinguishing the supply of "make-up" air or vapor to the relief tube 244.

As the nozzle 236 is inserted into the fuel nozzle chamber 124, the discharge end 238 first passes through the nozzle seal 92. By engaging the nozzle seal 92, the refuel nozzle 236 and seal 92 cooperate to provide an axially upper fluid seal for the refuel nozzle chamber 124. As the nozzle 236 continues to enter toward the fuel nozzle chamber 124, the discharge end 238 engages the trap door assembly 100 and overcomes the bias provided by the spring 112 to move the trap door assembly 100 to the open position. Because of the axial spacing provided between the seal 92 and the trap door assembly 100, it is insured that the trap door assembly 100 will not be open before the seal between the nozzle 236 and nozzle seal 92 is established. This advantageously prevents the possibility that any fuel or fuel vapor will be discharged toward the operator should "system pressure" still be present within the system. Although normal venting of the "system pressure" was described above in relation to FIG. 4, such venting of "system pressure" could possibly not occur under certain unusual circumstances due possibly to blockage of certain portions of the assembly 70. However, because of the seal between the nozzle 236 and the nozzle seal 92, the potential for discharge of the "system pressure" out of the fuel nozzle chamber 124 after the trap door assembly 100 has been opened is eliminated.

When the nozzle 236 is activated to begin pumping of fuel as indicated by the arrows 240, an effective seal is created at the axially lower end of the fuel nozzle chamber 124 by the fuel flowing into the fuel hose 130. This seal is established because of the close matching of the diameter of the discharge end 238 of the nozzle 236 and the diameter of the fuel hose 130. Thus, a substantially sealed fuel nozzle chamber 124 is established under these fuel pumping conditions. Because the fuel nozzle chamber 124 is substantially sealed, a vacuum is created within this chamber 124 due to the pumping of the fuel. To prevent the vacuum within the chamber 124 from rising above the preset level which would otherwise activate the automatic shutoff features of the nozzle 236, "make-up" air is provided to the chamber 124 through the orifice 156 from the shutoff control chamber 152. This "make-up" air is provided to the control chamber 152 through the hose 155 which extends into the fuel tank 12. By providing this "make-up" air from the control chamber 152, the vacuum within the fuel nozzle chamber 124 is controlled, and is maintained below the preset level necessary to shut off the nozzle 236. It will be understood that the size of the control chamber 152 and the size of the orifice 156 are selected to permit the correct amount of "make-up" air or vapor to constantly flow into the fuel nozzle chamber 124.

When the lower end (not shown) of the hose 155 becomes covered with fuel, the supply of "make-up" air to the control chamber 152 will be immediately shut off. Thus, under these conditions, the supply of "make-up" air to the fuel nozzle chamber 124 will immediately cease. When this "make-up" air is eliminated from the fuel nozzle chamber 124, the vacuum within the fuel nozzle chamber 124 quickly rises above the pre-set level necessary to disable the nozzle 236. Thus, the inflow of fuel from the nozzle 236 is immediately shut off. Because the flow of "make-up" air is shut off immediately when the fuel reaches the end of the hose 155 which immediately results in automatic shutoff of the refuel nozzle 236, the filling level within the tank 12 is accurately controlled by proper placement of the end of the hose 155.

When fuel is entering the fuel tank 12 as indicated by the arrows 240, fuel vapor is created within the fuel tank which creates a pressure within the fuel tank 12 somewhat above atmospheric pressure. This excess fuel vapor pressure will be guided through the vapor flow passage 168 and outwardly to the canister through the vapor discharge hose 172 as indicated by the arrows 246. The venting valve 176 is maintained in the valve open position because of the differential forces exerted on the valve 176. Specifically, atmospheric pressure is still present within the venting control chamber 180 which creates a specified valve closing force on the valve 176. However, the increased fuel vapor pressure within the fuel tank 12 is exerted on the portion 195 of the valve 176 through the vapor flow passage 168. This increased pressure acting over the area defined by the vapor flow passage 168 creates a valve opening force which overcomes the valve closing force and the biasing force provided by the spring 188 to cause the valve 176 to remain in the valve open position. This increased pressure within the fuel tank 12, and consequently within the conduit 170, will remain so long as fuel is being pumped into the fuel tank 12. Thus, so long as fuel is being introduced into the fuel tank 12, the increased pressure will be exerted on the portion 195 of the valve 176 through the vapor flow passage 168 which will cause the valve 176 to remain in the valve open position.

In order to prevent a possibility that liquid fuel might migrate axially upwardly between the outer surface of the nozzle 236 and the inner surface of the fuel nozzle chamber 124 due to capillary action, the ribs 128 create adequate spacing between the nozzle 236 and the surface of the fuel nozzle chamber 124 to prevent any such upward migration of fuel due to capillary action. It will be understood that such migration of fuel due to capillary action might otherwise cause premature shut off of the nozzle 236 due to such migrating fuel possibly covering the relief port 242.

FIG. 6 illustrates the vapor recovery assembly 70 immediately after the fuel nozzle 236 has been shut off due to the fuel 220 covering the distal end of the hose 155 to shut off the supply of "make-up" air to the control chamber 152. As soon as fuel ceases to flow into the fuel tank 12 (not shown), the pressure within the fuel tank 12 and entire system decreases almost immediately to atmospheric pressure. This decrease in pressure is attributable to the fact that the increased pressure due to creation of fuel vapor is only created while fuel is flowing into the fuel tank 12. As soon as fuel ceases to flow into the fuel tank 12, the creation of fuel vapor is eliminated, and therefore the source of the increased pressure within the system is also eliminated.

When the pressure within the conduit 170 and vapor flow passage 168 decreases to atmospheric pressure, the valve 176 will close to seal the vapor flow passage 168. This closure of the valve 176 is caused by the biasing force of the spring 188. Specifically, the pressure within the venting control chamber 180 remains at atmospheric pressure as described previously. Also, the pressure exerted on the portion 196 of the valve 176 is atmospheric pressure due to the canister and vapor discharge hose 172 being at atmospheric pressure. Additionally, the pressure within the vapor flow passage 168 is also atmospheric pressure. Therefore, the opposing forces exerted on the valve 176 due to these opposing pressures are equal.

Thus in this instance, the valve 176 is neither urged to the valve open position or the valve closing position by differing pressures. However, the biasing force of the spring 188 is sufficient to urge the valve 176 to the closed position under these circumstances. Thus, as soon as the refueling operation is completed, the valve 176 will return to the valve closed position to isolate the canister (not shown) from any flow of fuel vapor.

FIG. 7 illustrates the operation of the vapor recovery assembly 70 should the fuel nozzle 236 continue to pump fuel because of a failure of the automatic shutoff feature of the nozzle 236. Thus, FIG. 7 illustrates that the fuel level 220 has risen above the end of the hose 155, and has covered the end of the overfill tube 218. In such an overfill condition, it will be understood that it is extremely important to protect the canister from any exposure to liquid fuel. To eliminate any possibility of liquid fuel flowing through the vapor flow passage 168 to the canister, the overfill shutoff valve 210 is provided to close the vapor flow passage 168 under such an overfill condition. Specifically, when the fuel level 220 reaches the overfill tube 218, the fuel flows up the overfill tube 218 a certain amount and creates an increased, pressure within the overfill control chamber 214. This increased pressure within the overfill control chamber 214 overcomes the biasing force provided by the spring 220 and forces the overfill shutoff valve 210 to the closed position where the vapor flow passage 168 is sealed.

By sealing the vapor flow passage 168, the possibility of any exposure of the canister to liquid fuel is eliminated. So long as fuel 220 remains over the distal end of the overfill tube 218, the increased pressure created within the overfill control chamber 214 will hold the overfill shutoff valve 210 in the closed position. It will be understood that the overfill shutoff valve 210 is necessary because if fuel is continuing to be introduced into the fuel tank 12, fuel vapor will constantly be created which will cause the valve 176 to remain in its valve open position (not shown in FIG. 7). Thus, the additional overfill shutoff valve 210 is necessary to shut off the vapor flow passage 168 under such an overfill condition.

FIG. 8 illustrates the operation of the vapor recovery assembly 70 if the overfill condition illustrated in FIG. 7 is continued. Should fuel be pumped into the fuel tank 12 after the overfill shutoff valve 210 is closed, fuel will ultimately enter the fuel nozzle chamber 124 and continue upwardly. This introduction of fuel into the fuel nozzle chamber 124 will increase the pressure within the fuel nozzle chamber 124. To eliminate this increase of pressure, the bypass safety valve assembly 132 is configured to open to relieve this excess pressure under these conditions. Specifically, the bypass valve member 138 is configured to open by overcoming the bypass spring 140 whenever the pressure within the fuel nozzle chamber 124 reaches a predetermined level. When this predetermined level is reached, the valve 138 opens and fuel and/or fuel vapor is channeled through the bypass channel 142 into the cap receiving cup 76 through the bypass opening 144. The bypass opening 144 is sized and oriented to direct this inflow of fuel in a direction perpendicular to the longitudinal axis of the assembly 70. Additionally, the opening 144 is sized and configured to cause such a flow of fuel to be a low velocity flow into the cup 76. Thus, as fuel is introduced into the cap receiving cup 76 as indicated by the arrows 252, such low velocity flow of fuel will be directed toward the opposite side of the cup 76 and not toward the operator. Such an introduction of fuel into the cup 76 provides a visual indication to the operator that the nozzle should be manually shut off at this point. By providing the capability that this excess fuel an fuel pressure can be vented to the cup 76, excessive pressure build up within the fuel tank 12 is eliminated under these overfill conditions.

FIG. 9 illustrates the operation of the vapor recovery assembly 70 whenever a lower than atmospheric pressure exists within the fuel tank 12. It will be understood that such a lower than atmospheric pressure can occur within the fuel tank 12 whenever the vehicle is exposed to cooler than normal temperatures, such as parking the vehicle overnight. Under such conditions, the fuel and vapor within the fuel tank 12 decreases somewhat in volume which creates a lower than atmospheric pressure within the fuel tank 12. It will be understood that it is necessary to compensate for this lower than atmospheric pressure in order to avoid possible damage to the fuel tank 12 and other systems.

When such a lower than atmospheric pressure exists within the fuel tank 12, this lower than atmospheric pressure will be transmitted to the venting control chamber 180 through the actuation conduit 184. This lower than atmospheric pressure is exerted over the entire area of the first side 192 of the venting valve 176. Altough this lower than atmospheric pressure is also exposed to the portion 195 of the second side 194 of the venting valve 176, the force created on the smaller area defined by the portion 195 is insufficient to overcome the valve opening force exerted on the first side 192 of the venting valve 176, and therefore the venting valve 176 is moved to the valve open position. With the venting valve 176 open, atmospheric pressure within the canister and vapor discharge hose 172 is permitted to enter the fuel tank through the vapor flow passage 168 and conduit 170 to relieve the lower than atmospheric pressure within the fuel tank 12. Thus, the vapor recovery assembly 70 operates under such lower than atmospheric system pressure to equalize the lower than normal pressure within the fuel tank to prevent any possible damage to the fuel tank and associated systems. This provides the advantage of purging the canister at intervals.

Figure 10:
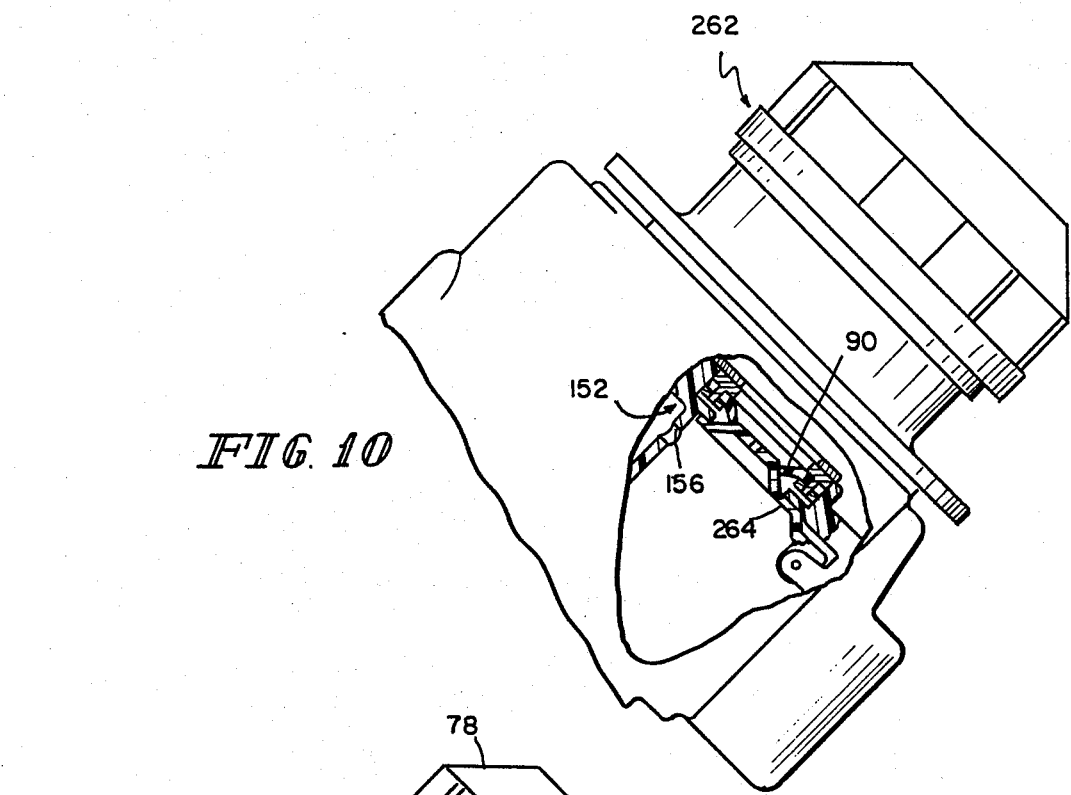
FIG. 10 is an elevational view of a portion of a modified vapor recovery assembly with a portion broken away to expose a modified trap door assembly.

FIG. 10 illustrates another embodiment 262 of a vapor recovery assembly which includes a modified trap door assembly 264. Specifically, the modified trap door assembly 264 is shaped and oriented to come into contact with the nozzle seal 90. By contacting the nozzle seal 90, the trap door assembly 264 is able to provide a more effective seal than the trap door assembly 100 seating against the ledge 96 (shown in FIG. 3).

Figure 11:
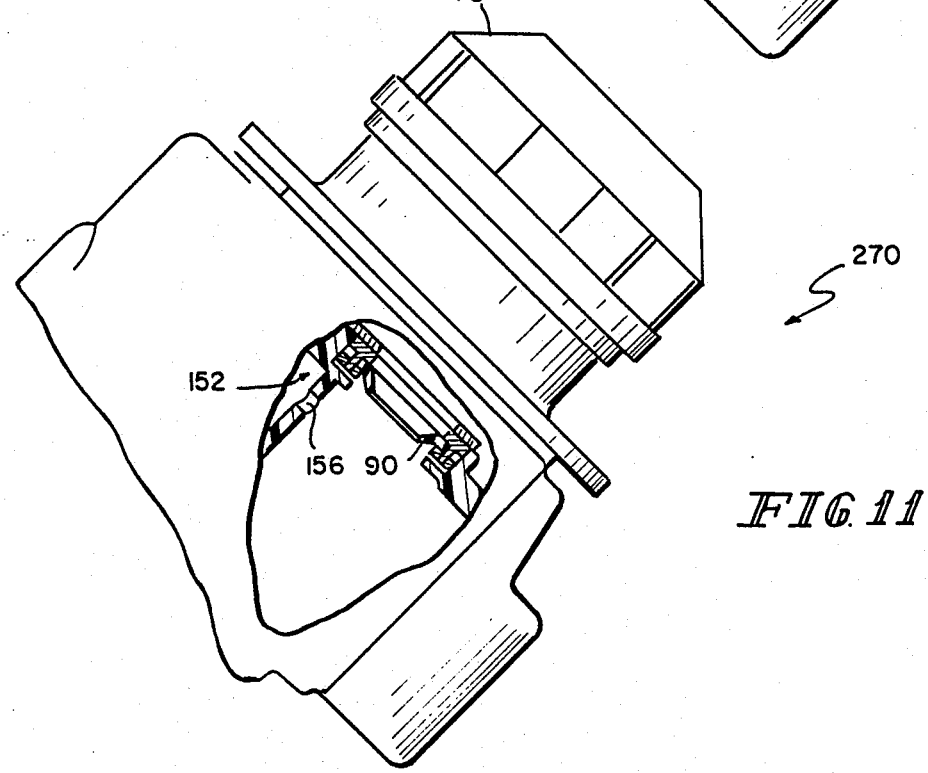
FIG. 11 is a view similar to FIG. 10 illustrating another embodiment which does not include the trap door assembly.

FIG. 11 illustrates another embodiment 270 of a vapor recovery assembly in which the trap door assembly has been eliminated. It will be understood that without a trap door assembly in place, the "system pressure" contained within the fuel tank 12 and assembly 270 will vent to the atmosphere when the fuel cap 78 is removed from the assembly 270. Thus, without a trap door assembly, venting of such "system pressure" through the canister as discussed in the description related to FIG. 4 will not occur. In such an embodiment, it is preferable to include a fuel cap 78 which controls and directs this venting of "system pressure" during cap removal. Such a fuel cap is described in U.S. Pat. No. 4,676,390, the specification of which is hereby incorporated by reference.

Figure 12:
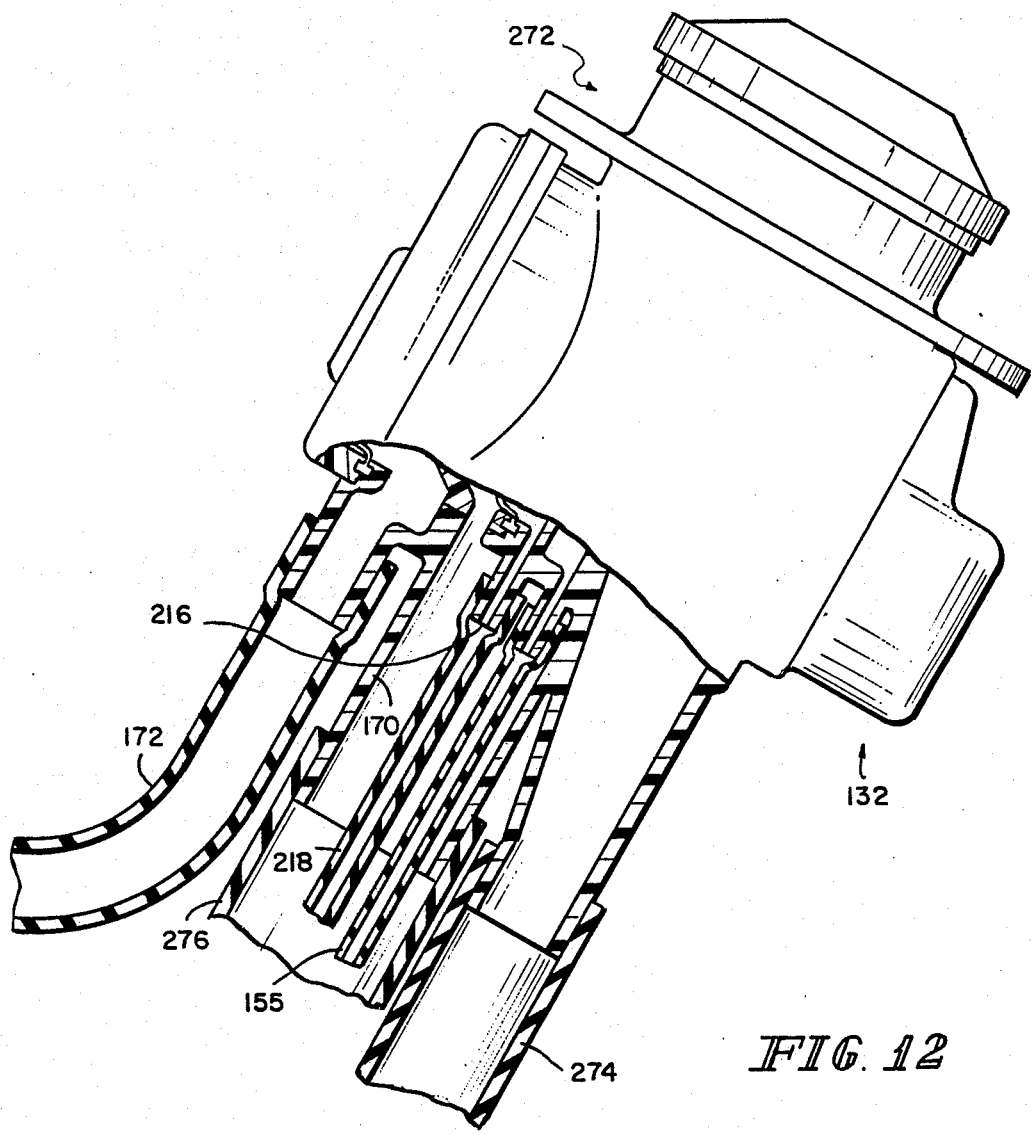
FIG. 12 is a view of another embodiment of the present invention illustrated in FIG. 2 with portions broken away.

FIG. 12 illustrates another embodiment 272 of a vapor recover assembly which corresponds to the modified vapor recovery system 60 illustrated in block diagram in FIG. 2. Specifically, the assembly 270 includes a separate refuel tube 274 which is spaced apart from a vent control tube 276. The vent control tube 276 is configured to contain both the overfill tube 218 and the hose 155, as well as the conduit 170. Such an assembly 272 with a separate refuel tube 274 and vent control tube 276 may be preferable in certain installations as directed by structural requirements. The assembly 272 will function in an identical manner to the assembly 70 illustrated in FIG. 3 except for the attachment of the refuel tube 274 and vent control tube 276 to the fuel tank 12.

Thus, the vapor recovery system of the present invention is configured to control fuel vapor created during fuel introduction into the fuel tank under all normal conditions. The system is also configured to provide for more accurate filling of a fuel tank by controlling more precisely the automatic shutoff characteristics of a fuel nozzle. In addition, the system according to the present invention provides for overfill protection both by protecting the canister from exposure to liquid fuel and by providing a by-pass assembly which prevents any overpressurization of the fuel tank due to overfilling. Additionally, the system provides for equalization of pressure within the fuel tank 12 whenever a lower than atmospheric pressure occurs within the fuel tank.

Although the invention has been described in detail with reference to preferred embodiments and specific examples, variations and modifications exist within the scope and spirit of the invention as described and defined in the following claims.

What is claimed is:

1. A system for recovering fuel vapors from a vehicle system during refueling, the vehicle fuel system including a fuel tank and canister means for processing fuel vapor, the system comprising
    delivery means for conducting fuel vapor between the fuel tank and tne canister means,
    valve means for selectively blocking flow of fuel vapor through the delivery means, the valve means being movable between a flow-blocking position and flow-delivery positions,
    passageway means for communicating a closing pressure from the fuel tank to the valve means to move the valve means to its flow-blocking position, an
    actuation means for selectively venting the passageway means to the atmosphere to dissipate any closing pressure therein to permit pressure generated by fuel vapor in the fuel tank having a magnitude in excess of a predetermined threshold level and communicated to the valve means via the delivery means to apply a load to the valve means sufficient to move the valve means from its flow-blocking position to a flow-delivery position, thereby permitting pressurized fuel vapor to flow from the fuel tank to the canister means through the delivery means, the valve seat engaging the first surface upon closure of the valve means to its flow-blocking position to define a third effective area outside the venting area exposed to pressure communicated from the canister means via the delivery means, the first and second effective areas cooperating to provide vacuum relief means for generating a movement-inducing load on the first surface that is relatively larger than any movement-inducing load on the second surface in response to communication of a predetermined negative pressure to both of the first and second effective areas and exposure of the third effective area to another pressure having a magnitude that is greater than the magnitude of the predetermined negative pressure so that the vent valve is moved from a flow-blocking position against the valve seat to a flow-admitting position away from the valve seat, whereby suction within the fuel tank draws air and fuel vapor in the canister means into the fuel tank.

2. A system for recovering fuel vapors discharged from a vehicle fuel system during refueling, the vehicle fuel system including a fuel tank and a canister means for processing fuel vapor, the system comprising
    delivery means for conducting fuel vapor between the fuel tank and the canister means,
    valve means for selectively blocking flow of fuel vapor through the delivery means, the valve means being movable between a flow-blocking position and flow-delivery positions.
    passageway means for communicating a closing pressure from the fuel tank to the valve means to move the valve means to its flow blocking position,
    actuation means for selectively venting the passageway means to the atmosphere to dissipate any closing pressure therein to permit pressure generated by fuel vapor in the fuel tank having a magnitude in excess of a predetermined threshold level and communicated to the valve means via the delivery means to apply a load to the valve means sufficient to move the valve means from its flow-blocking position to a flow-delivery position, thereby permitting pressurized fuel vapor to flow from the fuel tank to the canister means through the delivery means, and
    overfill sensor means for blocking flow of liquid fuel and fuel vapor from the fuel tank to the canister means through the delivery means upon accumulation of a predetermned volume of liquid fuel in the fuel tank in excess of a predetermined threshold level.

3. The system of claim 2, wherein the delivery means includes an inner surface defining a venting aperture and providing a valve seat surrounding the venting aperture and the overfill sensor means includes a shut-off valve mounted in the delivery means for movement between an opened and closed position, spring means for yieldably biasing the shut-off valve to an opened position away from the valve seat, and control means for moving the shut-off valve against the spring means to engage its valve set to close the venting aperture in response to immersion of a portion of the control means positioned in one of the fuel tank and the delivery means in liquid fuel.

4. A system for recovering fuel vapors discharged from a vehicle fuel system during refueling, the vehicle fuel system including a fuel tank and a canister means for processing fuel vapor, the system comprising
    delivery means for conducting fuel vapor between the fuel tank and the canister means,
    valve means for selectively blocking flow of fuel vapor through the delivery means, the valve means being movable between a flow-blocking position and flow-delivery positions,
    passageway means for communicating a closing pressure from the fuel tank to the valve means to move the valve means to its flow blocking position, and
    actuation means for selectively venting the passageway means to the atmosphere to dissipate any closure pressure therein to permit pressure generated by fuel vapor in the fuel tank having a magnitude in excess of a predetermined threshold level and communicated to the valve means via the delivery means to apply a load to the valve means sufficient to move the valve means from its flow-blocking position to a flow-delivery position, thereby permitting pressurized fuel vapor to flow from the fuel tank to the canister means through the delivery means; the passageway means including a tank filler conduit communicating with the fuel tank and terminating at a mouth, partition means for dividing the tank filler conduit into an outer chamber communicable with the atmosphere through the mouth and a separate inner chamber in fluid communication with the fuel tank, the partition means including a nozzle-receiving passageway interconnecting the inner and outer chambers, an annular valve seat surrounding the passageway, a flap valve, and spring means for yieldably biasing flap valve against the valve seat normally to close the nozzle-receiving passageway, the flap valve being formed to include orifice means for communicating pressurized fuel vapor in the inner chamber to the outer chamber while the flap valve is in its position closing the nozzle-receiving passageway so that said pressurized fuel vapor is communicable from the outer chamber to the valve means by the passageway means prior to venting of the passageway means by operation of the actuation means.

5. The system of claim 4, wherein the partition means further includes a nozzle seal means for sealingly embracing a fuel dispensing nozzle inserted into the inner chamber through the nozzle-receiving passageway without placing the inner and outer chambers in fluid communication during a fuel-dispensing refueling activity.

6. The system of claim 5, wherein the nozzle seal means and the flap valve in its biased position against the valve seat are situated in spaced-apart relation along the logitudinal axis of the nozzle-receiving passageway so that the nozzle seal means is situated at one end of the nozzle-receiving passageway in close proximity to the outer chamber, the flap valve in its biased position against the valve seat is situated at the other end of the nozzle-receiving passageway in close proximity to the inner chamber.

7. A system for recovering fuel vapors discharged from a vehicle fuel system during refueling, the vehicle fuel system including a fuel tank and a canister means for processing fuel vapor, the system comprising delivery means for conducting fuel vapor between the fuel tank and the canister means, valve means for normally blocking flow of fuel vapor through the delivery means, the valve means including one portion to fuel vapor conducted by the delivery means and a remaining portion, the valve means being movable relative to the delivery means between a flow-blocking position and flow-delivering positions in response to exposure of the valve means to a differential pressure created by differing magnitudes of pressure communicated to the one portion and the remaining portion and exposure of the one portion to pressure having a magnitude in excess of a predetermined threshold level.

passageway means for establishing communication of pressurized fuel vapor in the fuel tank with the remaining portion of the valve means, and actuation means for selectively venting fuel vapor in the passageway means to the atmosphere to lower the magnitude of pressure communicated to the remaining portion of the valve means by the passageway means relative to the magnitude of pressure communicated to the one portion of the valve means by the delivery means to establish the differential pressure so that a movement-inducing load resulting from the pressure communicated to the one portion having a magnitude in excess of the predetermined threshold level is applied to move the valve means to a flow-delivering position, the passageway means including aperture means for exhausting pressurized fuel vapor into the passageway means to the atmosphere, a tank filler conduit interconnecting the fuel tank and the aperture means, and parition means for dividing the tank filler conduit into an outer chamber communicable with the atmosphere via the aperture means and an inner chamber in fluid communication with the fuel tank, the aperture means being sized to receive a fuel-dispensing nozzle to admit fuel into the fuel tank through the tank filler conduit, the partition means including first sealing means for sealingly admitting a fuel-dispensing nozzle into the inner chamber without coupling the inner and outer chambers in fluid communication during refueling to preserve any differential pressure communicated to the valve means during refueling, thereby maintaining the valve means in a flow-delivering position, the partition means further including second sealing means for selectively limiting the flow of pressurized fuel vapor from the fuel tank to the aperture means via the tank filler conduit, the second sealing means being situated in the tank filler conduit intermediate the fuel tank and the first sealing means, and the second sealing means being formed to include vapor distribution means for discharging a substantially constant volumetric flow rate of fuel from the fuel tank toward the aperture means as long as the pressure of said fuel vapor remains substantially constant so that pressurized fuel vapor is suppliable to the remaining portion of the valve means by the passageway means prior to operation of the actuation means to vent the passageway means to the atmosphere.

8. A system for recovering fuel vapors discharged from a vehicle fuel system during refueling, the vehicle fuel system including a fuel tank and a canister means for processing fuel vapor, the system comprising delivery means for conducting fuel vapor between the fuel tank and the canister means, valve means for selectively blocking flow of fuel vapor through the delivery means, the valve means being movable between a flow-blocking position and flow-delivery positions, venting control chamber means for containing fuel vapor in a predetermined region communicating with the valve means and permitting fuel vapor to exert a closing force on the valve means causing the valve means to move to its flow-blocking position, thereby blocking discharge of fuel vapor in the fuel tank to the canister means via the delivery means, and overfill sensor means for blocking flow of liquid fuel and fuel vapor from the fuel tank to the canister means through the delivery means upon accumulation of a predetermined volume of liquid fuel in the fuel tank in excess of a predetermined threshold level.

9. In a vehicle having a fuel tank, a filler neck for filling the fuel tank, a cap for closing the filler neck, and a vapor treatment site, an improved system for capturing vapors normally discharged during a vehicle refueling activity wherein the improvement comprises delivery means for providing a vent passageway in fluid communication with the fuel tank and the vapor treatment site, valve means for normally closing the vent passageway, the valve means being movable between a vent passageway-opening and vent passageway-closing position, the delivery means including first passageway means for establishing fluid communication of fuel vapor in the filler neck with the valve means so that pressure provided by the fuel vapor therein acts to exert opening-inducing force on the valve means, actuator means for moving the valve means to its vent passageway-opening position in response to movement of the cap so that fuel vapors in the fuel tank are conducted toward the vapor treatment site via the vent passageway, the actuator means including second passageway means for establishing fluid communication of fuel vapor in the filler neck with the valve means so that pressure provided by the fuel vapor therein acts to exert a closure-inducing force on the valve means and venting means actuated by movement of the fuel cap for selectively exhausting pressurized fuel vapor from the second passageway means to the atmosphere so that any closure-inducing force exerted on the valve means by the pressure in the second passageway means is less than the opening-inducing pressure exerted on the valve means by the pressure in the first passageway means to permit the valve means to move toward a vent passageway-opening position, and safety valve means for exhausting fuel vapor in the second passageway means to the atmosphere whenever the valve means is substantially immovable from its normal passageway-closing position during a refueling activity cycle due to malfunction.

10. The improvement of claim 9, wherein the venting means includes aperture means providing a nozzle-receiving mouth of the filler neck for venting the second passageway means and seal means coupled to the fuel cap for sealingly engaging the areture means to prevent exhaustion of pressurized fuel vapor therethrough upon movement of the fuel cap to a filler neck-closing position so that sufficient movement of the fuel cap relative to the filler neck in a cap-removal direction to break any seal established by the seal means to dissipate pressure in the second passageway means sufficiently to cause the valve means to move toward a vent passageway opening position.

11. In a vehicle having a fuel tank, a filler neck for filling the fuel tank, a cap for closing the filler neck, and a vapor treatment site, an improved system for capturing vapors normally discharged during a vehicle refueling activity wherein the improvement comprises delivery means for providing a vent passageway in fluid communication with the fuel tank and the vapor treatment site, valve means for normally closing the vent passageway, the valve means being movable between a vent passageway-opening and vent passageway-closing position, the delivery means including first passageway means for establishing fluid comnunication of fuel vapor in the filler neck with the valve means so that pressure provided by the fuel vapor therein acts to exert opening-inducing force on the valve means, actuator means for moving the valve means to its vent passageway-opening in response to movement of the cap so that fuel vapors in the fuel tank are conducted toward the vapor treatment site via the vent passageway, the actuator means including second passageway means for establishing fluid communication of fuel vapor in the filler neck with the valve means so that the pressure by the fuel vapor therein acts to exert a closure-inducing force on the valve means and venting means actuated by movement of the fuel cap for selectively exhausting pressurized fuel vapor from the second passageway means to the atmosphere so that any closure-inducing force exerted on the valve means by the pressure in the second passageway means is less than the opening-inducing pressure exerted on the valve means by the pressure in the first passageway means to permit the valve means to move toward a vent passageway-opening position, and overfill sensor means for blocking flow of liquid fuel and fuel vapor from the fuel tank to the vapor treatment site upon accumulation of a predetermined volume of liquid fuel in the fuel tank in excess of a predetermined threshold level.

12. An assembly in a vehicle fuel system having a fuel tank for automatically controlling shut-off of a vacuum-actuated nozzle for dispensing fuel into the fuel tank, the nozzle having a distal end and a means for triggering shut-off of fuel flow from the nozzle upon exposure to a predetermined negative pressure, the assembly comprising a tank filler conduit communicating with the fuel tank at its proximal end and terminating at a nozzle-receiving mouth at its distal end, partition means for dividing the tank filler conduit into an outer chamber communicable with the atmosphere via the nozzle-receiving mouth and an inner chamber in fluid communication with the fuel tank, the partition means including aperture means for sealingly admitting the fuel-dispensing nozzle into the inner chamber without coupling the inner and outer chambers in fluid communication during refueling to establish a vacuum seal between the inner and outer chambers, the inner chamber providing means for substantially engaging a circumferential portion of the distal end of the fuel-dispensing nozzle during refueling to establish a vacuum seal between the fuel tank and the inner chamber during introduction of liquid fuel into the tank filler conduit via the fuel-dispensing nozzle, and vacuum regulator means for providing make-up vapor from the fuel tank to the inner chamber during introduction of liquid fuel into the tank filler conduit to maintain pressure in the inner chamber at a magnitude in excess of the predetermined negative pressure, thereby preventing premature exposure of the triggering means in the nozzle to a shut-off triggering negative pressure, the vacuum regulator means including fuel level sensor means in communication with the fuel tank for halting the provision of make-up air to the inner chamber upon accumulation of liquid fuel in the fuel tank in excess of a predetermined volume so that at least the predetermined negative pressure develops in the inner chamber to actuate the shut-off triggering means of the nozzle to stop dispensation of liquid fuel from the nozzle automatically.

13. The assembly of claim 12, wherein the engaging means includes an interior wall and spacer means extending from the interior wall into the inner chamber for separating the circumferential portion of the nozzle distal end from the interior wall to prevent movement of liquid fuel between the circumferential portion of the distal end and the interior wall due to capillary action.

14. The assembly of claim 13, wherein the spacer means includes a plurality of upstanding ribs circumferentially spaced about the interior wall.

15. The assembly of claim 12, wherein the engaging means includes a longitudinally extending funnel-shaped interior wall converging in an inwardly extending direction within the tank filler conduit from the partition means toward the fuel tank.

16. The assembly of claim 12, wherein the tank filler conduit includes side walls cooperating to define the inner chamber and the vacuum regulator means includes an inlet orifice formed in the side wall and means for communicating fuel vapor from the fuel tank to the inner chamber through the inlet orifice.

17. The assembly of claim 16, wherein the vacuum regulator means includes a fuel-conducting tube having one end positioned at a predetermined location within the fuel tank and the other end coupled to the communicating means so that introduction of liquid fuel into the one end effectively shuts off the supply of make-up vapor from the fuel tank to the inner chamber, thereby increasing the negative pressure within the inner chamber upon continued introduction of liquid fuel into the tank filler conduit by the nozzle.

18. A system for automatically blocking flow of fuel from a fuel-dispensing nozzle into a fuel tank, the nozzle having a dispensing end and means in the dispensing end for triggering shut-off of fuel flow from the dispensing end upon exposure to a predetermined negative pressure, the system comprising a filler neck coupled to the fuel tank, the filler neck including chamber means for receiving the nozzle during refueling, the chamber means being formed to include first inlet means for sealingly receiving the dispensing end of the nozzle, second inlet means for receiving a supply of make-up vapor, and outlet means for communicating liquid fuel to the fuel tank, the outlet means having an internal diameter selected to fill the outlet means substantially with fuel during introduction of fuel from the nozzle into the filler neck to establish means for blocking the flow of fuel vapor from the fuel tank to the chamber means through the outlet means during refueling, and means communicating with the second inlet means for selectively supplying make-up vapor from the fuel tank to the chamber means during refueling so that the magnitude of pressure in the chamber means exceeds the magnitude of the predetermined negative pressure only until the volume of liquid fuel in the fuel tank exceeds a predetermined volume.

19. The system of claim 18, wherein the chamber means includes an interior wall formed to define the outlet means and spacer means for separating the dispensing end of the nozzle from the interior wall to prevent movement of liquid fuel between the dispensing end and the interior wall due to capillary action.

20. The system of claim 19, wherein the spacer means includes a plurality of upstanding ribs circumferentially spaced about the interior wall.

21. The assembly of claim 18, wherein the supplying means includes a fuel-conducting tube having one end positioned at a predetermined location within the fuel tank and the other end coupled to the second inlet means so that introduction of liquid fuel into the one end effectively shuts off the supply of make-up vapor from the fuel tank to the chamber means, thereby increasing the negative pressure within the inner chamber during continued refueling.

22. A filler neck assembly for use with a fuel tank, the assembly comprising a fill tube including an inlet portion having a first internal diameter, an outlet portion having a second internal diameter less than the first internal diameter, and a necked-down converging portion interconnecting the inlet and outlet portions and converging along the longitudinal axis of the fill tube in an inwardly extending direction from the inlet portion toward the outlet portion, the fill tube further being formed to include inlet means for receiving a supply of make-up vapor, the inlet portion providing means for sealingly admitting a fuel-dispensing nozzle, the outlet portion providing means for conducting fuel from the fuel-dispensing nozzle to a fuel tank, and means for communicating fuel vapor from the fuel tank to the inlet means to regulate pressure at least in the converging and outlet portions, the communicating means having a fuel vapor exhaust end coupled to the inlet means and a fuel vapor intake end positioned in the fuel tank to admit liquid fuel accumulating in the tank into the communicating means upon accumulation of liquid fuel in excess of a first predetermined volume to shut off any flow of fuel vapor from the fuel tank to the inlet means via the communicating means.

23. The assembly of claim 22, wherein the converging portion includes an interior wall and spacer means on the wall for separating the nozzle from the interior wall to prevent movement of liquid fuel between the nozzle and the interior wall due to capillary action.

24. The system of claim 23, wherein the spacer means includes a plurality of upstanding ribs circumferentially spaced about the interior wall.

25. The system of claim 22, in combination with a system for handling fuel vapors from the fuel tank, the vapor-handling system including processor means for processing fuel vapor, delivery means for conducting fuel vapor between the fuel tank and the processor means, and means for selectively blocking flow of fuel vapor through the delivery means, further comprising auxiliary shut-off means for preventing liquid fuel flow to the processor means via the delivery means upon accumulation of liquid fuel in the fuel tank in excess of a second predetermined volume greater than the first predetermined volume due to malfunction of at least one of the communicating means and admitting means.

26. A system for handling fuel vapors from a vehicle fuel system having a fuel tank, a filler neck, and means for processing fuel vapor, the system comprising means for conducting fuel vapor between the fuel tank and the processing means, first means for selectively blocking flow of fuel vapor through the conducting means, and means for preventing liquid fuel carryover to the processing means via the conductind means, the preventing means including flow-disabling means for automatically shutting off a fuel dispensing nozzle in the filler neck upon accumulation of liquid fuel in the fuel tank in excess of a first predetermined volume, and second means for selectively blocking flow of liquid fuel and fuel vapor through the conducting means upon accumulation of liquid fuel in the fuel tank in excess of a second predetermined volume greater than the first predetermined volume due to malfunction of the flow-disabling means, the second means being positioned in the conducting means intermediate the fuel tank and the first means.

27. The system of claim 26 wherein the preventing means further comprises bypass means for venting the filler neck in response to pressure in the filler neck in excess of a predetermined magnitude, the bypass means being configured to include means for providing at least one of an audible signal and a visual signal to a nozzle operator that the accumulation of liquid fuel in the fuel tank has exceeded the second predetermined volume, thereby advising the nozzle operator to shut off the nozzle manually.

28. A system for providing an indication that a fuel tank has been overfilled, the system comprising
   a filler neck formed to include means for providing a longitudinally extending nozzle-receiving passageway having a mouth and a longitudinal axis,
   means for dividing the nozzle-receiving passageway into an outer chamber communicable with the atmosphere through the mouth and an inner chamber in fluid communication with the fuel tank, the dividing means including means situated in spaced relation to the mouth for sealingly admitting a fuel-dispensing nozzle into the chamber without coupling the inner and outer chambers in fluid communication so that liquid fuel and fuel vapor is discharged from the inner chamber in a direction along the longitudinal axis of the nozzle-receiving passageway while the nozzle is in the admitting means,
   a partition wall formed to include the admitting means, and a side wall coupled to the partition wall to define the outer chamber and formed to include an inlet aperture, and
   bypass means for selectively conducting liquid fuel and fuel vapor from the inner chamber around the dividing means to the inlet aperture of the side wall so that liquid fuel and fuel vapor introduced into the outer chamber via the inlet aperture is aimed in a direction transverse to the longitudinal axis of the nozzle-receiving passageway and toward a portion of the side wall opposite the inlet aperture causing the flow of liquid fuel and fuel vapor to swirl around in the outer chamber providing one observing the fuel-dispensing nozzle with an indication that the fuel tank is overfilled.

29. The system of claim 28, wherein the bypass means includes a bypass channel sized and configured to define nozzle means diverging in a direction extending from the inner chamber toward the inlet aperture for decelerating the flow rate of liquid fuel and fuel vapor conducted therethrough to cause such flow to be a low-velocity flow as it enters the outer chamber.

30. The system of claim 29, wherein the side wall is annular and the inlet aperture extends around a portion of the circumference of the side wall.

31. The system of caim 26, wherein the conducting means includes an inner surface defining an outlet aperture and providing a valve seat surrounding the outlet aperture and the second means includes a shut-off valve mounted in the conducting means for movement between an open and closed position, spring means for yieldably biasing the shut-off valve to an opened position away from the valve seat, and control means for moving the shut-off valve against the spring means to engage the valve seat to close the venting aperture in response to immersion of a portion of the control means positioned in one of the fuel tank and the conducting means in liquid fuel.

32. The system of claim 31, wherein the control means includes a fluid-conducting tube extending through the conducting means to communicate with the fuel tank.

33. The system of claim 31, wherein the shut-off valve and inner wall of the filler neck cooperate to define overfill control chamber means containing fuel vapor in a predetermined region communicating with the shut-off valve and permitting fuel vapor to exert a closing force on the shut-off valve to move against the spring means to its closed position, thereby blocking discharge of the liquid fuel and fuel vapor in the fuel tank to the processing means via the conducting means.

34. The system of claim 33, wherein the control means further includes a fluid-conducting tube interconnecting the fuel tank and the overfill control chamber means.

35. The system of claim 34, wherein the fluid-conducting tube extends through the conducting means.

36. A system for recovering fuel vapors discharged from a vehicle fuel system during refueling, the vehicle fuel system including a fuel tank, a filler neck, and means for processing fuel vapor, the system comprising
   means for conducting fuel vapor between the fuel tank and the processing means,
   valve means for selectively blocking flow of liquid fuel and fuel vapor through the conducting means, the valve means being movable between the flow-blocking and flow-delivery positions,
   overfill control chamber means for containing fuel vapor in a predetermined region communicating with the valve means and permitting fuel vapor to exert a closing force on the valve means to move to its flow-blocking position, and
   control means for increasing pressure within the overfill control chamber upon accumulation of liquid fuel in the fuel tank in excess of a predetermined threshold level so that said closing force is exerted on the valve means to prevent liquid fuel carryover from the fuel tank to the processing means via the conducting means.

37. The system of claim 36, wherein the conducting means includes an inner surface defining an outlet aperture and providing a valve seat surrounding the outlet aperture and further comprising spring means for yieldably biasing the valve means to a flow-delivery position away from the valve seat.

38. The system of claim 37, wherein the control means includes a fluid-conducting tube interconnecting the fuel tank and the overfill control chamber means to communicate liquid fuel from the fuel tank to pressurize fuel vapor in the overfill control chamber means so that the valve means is moved against the spring means to a flow-delivery position upon development of pressure in the overfill control chamber means in excess of a predetermined amount.

39. The system of claim 38, wherein the fluid-conducting tube extends through the conducting means.

40. The system of claim 36, futher comprising bypass means for venting the filler neck in response to pressure in the filler neck in excess of a predetermined magnitude, the bypass means being configured to include means for providing at least one of an audible signal and a visual signal to a nozzle operator that the accumulation of liquid fuel in the fuel tank has exceeded the second predetermined volume, thereby advising the nozzle operator to shut off the nozzle manually.

41. The system of claim 12, in combination with a system for handling fuel vapors from the fuel tank, the vapor-handling system including processor means for processing fuel vapor, delivery means for conducting fuel vapor between the fuel tank and the processor means, and means for selectively blocking flow of fuel vapor through the delivery means, further comprising auxiliary shut-off means for preventing liquid fuel flow to the processor means via the delivery means upon accumulation of liquid fuel in the fuel tank in excess of a second predetermined volume greater than the first predetermined volume due to malfunction of at least one of the providing means and admitting means.

42. The system of claim 18, in combination with a system for handling fuel vapors from the fuel tank, the vapor-handling system including processor means for processing fuel vapor, delivery means for conducting fuel vapor between the fuel tank and the processor means, and means for selectively blocking flow of fuel vapor through the delivery means, further comprising auxiliary shut-off means for preventing liquid fuel flow to the processor means via the delivery means upon accumulation of liquid fuel in the fuel tank in excess of a second predetermined volume greater than the first predetermined volume due to malfunction of at least one of the supplying means and receiving means.

* * * * *

UNITED STATES PATENT AND TRADEMARK OFFICE
CERTIFICATE OF CORRECTION

PATENT NO. : 4,816,045

DATED : March 28, 1989

INVENTOR(S) : Emil Szlaga et al.

It is certified that error appears in the above-identified patent and that said Letters Patent is hereby corrected as shown below:

At column 1, line 8, please delete "4,707,164" and insert therefor --4,770,677--;

At column 5, line 54, please delete "96is" and insert therefor --96 is--;

At column 6, line 50, please delete "snutoff" and insert therefor --shutoff--;

At column 6, line 52, please delete "Shutoff" and insert therefor --shutoff--;

At column 13, line 52, please delete "an" and insert therefor --and--;

At column 14, line 7, please delete "Altough" and insert therefor --Although--;

At column 15, line 16, after the word "vapors", please insert --discharged--;

At column 15, line 21, please delete "tne" and insert therefor --the--;

At column 15, line 56, please delete "is moved" (second occurrence);

At column 16, line 33, please delete "set" and insert therefor --seat--;

At column 17, line 1, please delete "nectinq" and insert therefor --necting--;

At column 17, line 3, after the word "biasing", please insert --the--;

At column 17, line 39, after the word "portion", please insert --exposed--;

UNITED STATES PATENT AND TRADEMARK OFFICE
CERTIFICATE OF CORRECTION

PATENT NO. : 4,816,045

DATED : March 28, 1989

INVENTOR(S) : Emil Szlaga et al.

It is certified that error appears in the above-identified patent and that said Letters Patent is hereby corrected as shown below:

At column 17, line 40, please delete "portion,the" and insert therefor --portion, the--;

At column 17, line 49, please delete "level." and insert therefor --level,--;

At column 18, line 1, please delete "parition" and insert therefor --partition--;

At column 19, line 34, please delete "areture" and insert therefor --aperture--;

At column 19, line 39, after the word "means", please insert --acts--;

At column 19, line 55, please delete "comnuni-" and insert therefor --communi---;

At column 22, line 13, please delete "sealinqly" and insert therefor --sealingly--;

At column 23, line 4, please delete "ventin9" and insert therefor --venting--;

At column 23, line 24, after the word "the", please insert --inner--;

UNITED STATES PATENT AND TRADEMARK OFFICE
CERTIFICATE OF CORRECTION

PATENT NO. : 4,816,045

DATED : March 28, 1989

INVENTOR(S) : Emil Szlaga et al.

It is certified that error appears in the above-identified patent and that said Letters Patent is hereby corrected as shown below:

At column 23, line 26, please delete "comnunication" and insert therefor --communication--;

At column 23, line 57, please delete "caim" and insert therefor --claim--; and

At column 24, line 62, please delete "futher" and insert therefor --further--.

Signed and Sealed this

Seventeenth Day of October, 1989

*Attest:*

DONALD J. QUIGG

*Attesting Officer*  *Commissioner of Patents and Trademarks*